(12) United States Patent
Kline et al.

(10) Patent No.: US 6,250,560 B1
(45) Date of Patent: Jun. 26, 2001

(54) VARIABLE-AIR-VOLUME DIFFUSER ACTUATOR ASSEMBLY AND METHOD

(75) Inventors: James R. Kline, Moraga; Robert S. Hunka, Oakland; Matthew L. Costick, Pleasanton, all of CA (US)

(73) Assignee: Acutherm L.P., Hayward, CA (US)

( * ) Notice: Subject to any disclaimer, the term of this patent is extended or adjusted under 35 U.S.C. 154(b) by 0 days.

(21) Appl. No.: 09/218,370

(22) Filed: Dec. 21, 1998

(51) Int. Cl.[7] ................................. F24F 7/00; F24F 3/00
(52) U.S. Cl. ...................... 236/49.3; 165/217; 454/258
(58) Field of Search ................... 236/78 D, 49.3; 454/258, 238; 165/213, 217

(56) References Cited

U.S. PATENT DOCUMENTS

| | | | |
|---|---|---|---|
| Re. 30,953 | 6/1982 | Vance et al. | 236/49.3 |
| 4,491,270 | 1/1985 | Brand | 236/49.5 |
| 4,509,678 | 4/1985 | Noll | 236/49.5 |
| 4,515,069 | 5/1985 | Kline et al. | 236/48 R X |
| 4,523,713 | 6/1985 | Kline et al. | 236/1 C |
| 4,537,347 | 8/1985 | Noll et al. | 236/49.5 |
| 4,821,955 | 4/1989 | Kline et al. | 236/49.3 |
| 4,848,147 | 7/1989 | Bailey et al. | 73/204.17 |
| 5,450,999 * | 9/1995 | Scholten et al. | 236/78 D X |
| 5,533,347 * | 7/1996 | Ott et al. | 236/78 D X |
| 5,613,369 * | 3/1997 | Sato et al. | 236/78 D X |

FOREIGN PATENT DOCUMENTS

| | | |
|---|---|---|
| 3500278A | 7/1986 | (DE) . |
| 404359735 * | 12/1992 | (JP) ................. 236/78 D |
| 88/01074 | 2/1988 | (WO) . |

OTHER PUBLICATIONS

Hagglund, et al., "Automatic Tuning of PID Controllers," *The Control Handbook*, pp. 817–826 (1996).
Petze, "Understanding PID Proportional–Integral–Derivative Control," *Engineered Systems*, pp. 43–46 (Jul.–Aug. 1987).

\* cited by examiner

*Primary Examiner*—William Wayner
(74) *Attorney, Agent, or Firm*—Flehr Hohbach Test Albritton & Herbert LLP

(57) ABSTRACT

An adaptive control device (77) and method (102–108) for control of the operation of an actuator (72), and particularly thermally-powered actuator (72) of the type used in a variable-air-volume diffuser (71). The preferred adaptive control device is an expert system circuit which controls a heater (74) provided on a thermally-powered actuator (72) to implement an adaptive process (102–108) in which a sensed variable, such as room air temperature, is driven toward a target temperature control range (±0.25° F.). Most preferably, the process steps (106) include driving the room air temperature toward a gross (broader) temperature control range (±1.0° F.) by moving a diffuser damper assembly (80) to a substantially fully open or substantially fully closed position. Thereafter, and while inside the gross temperature control range, the process steps (107, 108) include adjustments to the position of the damper assembly (80) are made only when a sensed parameter, preferably the supply air flow rate, is in a stable condition. Most preferably, the damper (80) is temporarily "kicked" farther open or farther closed than necessary, to minimize hysteresis effects, and then adjusted to a posiiton which tends to drive the room air temperature into the narrower, targeted temperature control range.

36 Claims, 16 Drawing Sheets

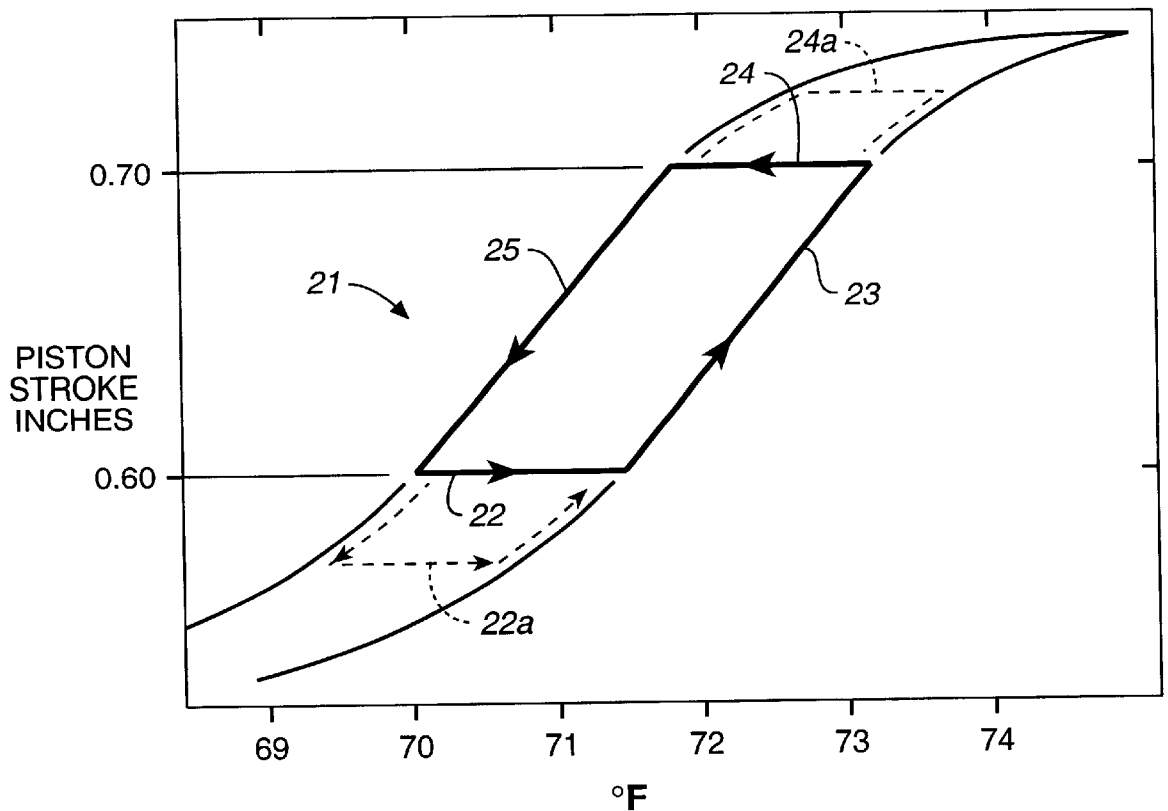
FIG._1
*(PRIOR ART)*

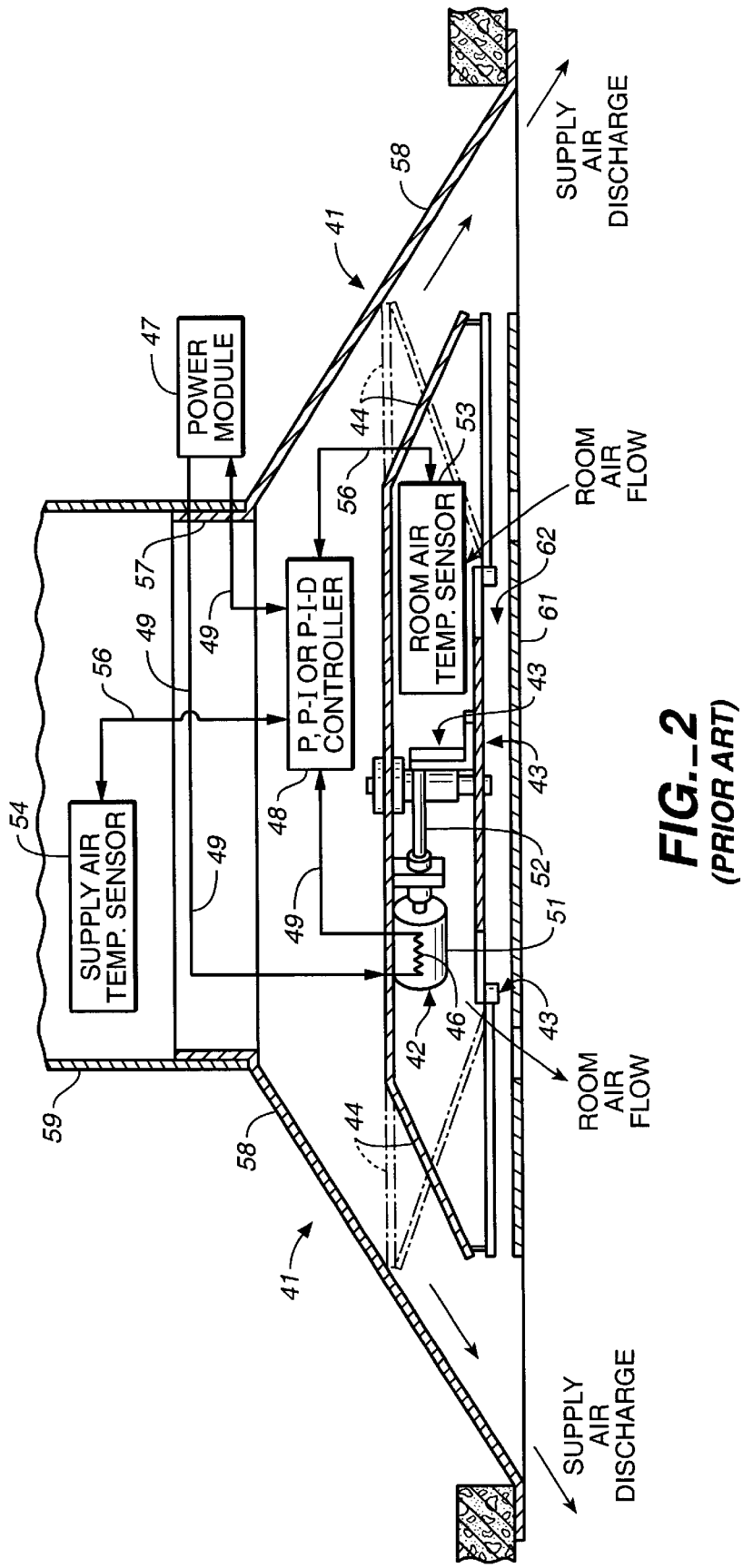
FIG._2 (PRIOR ART)

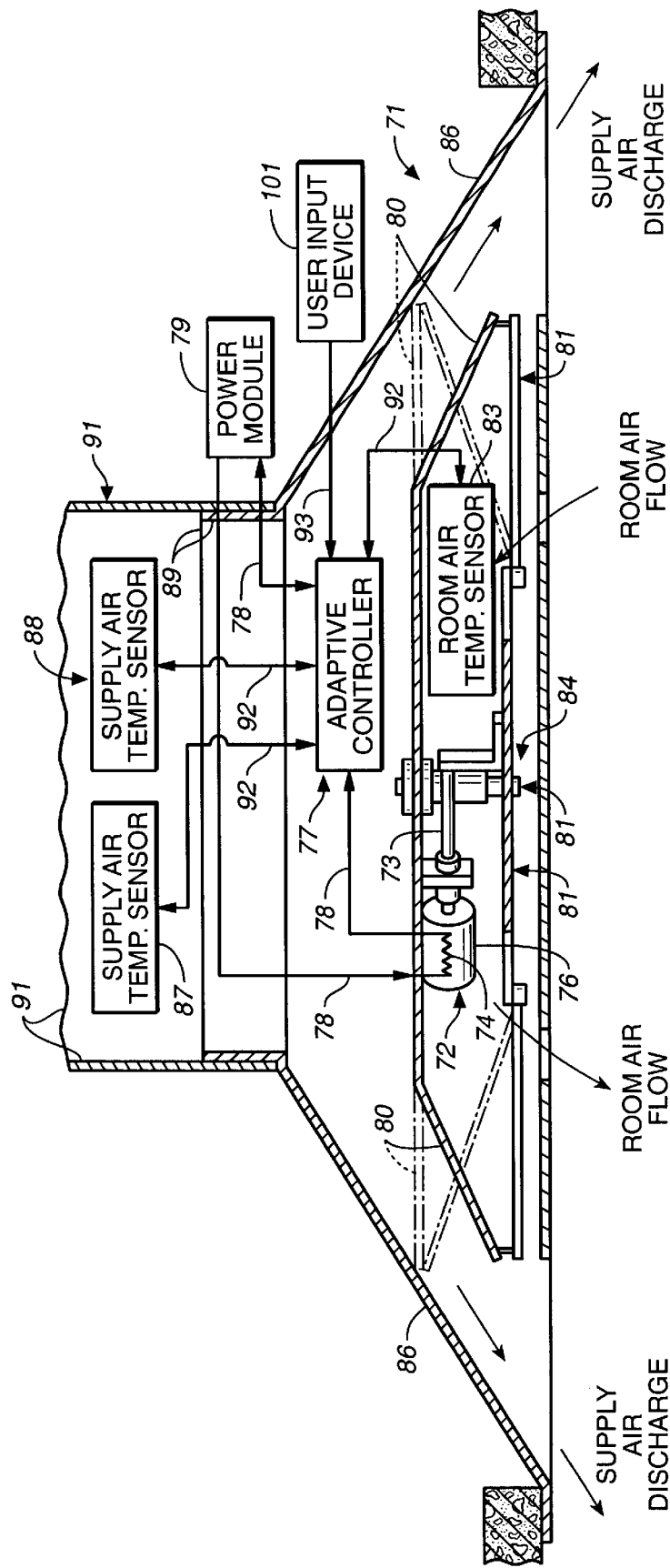
FIG._3

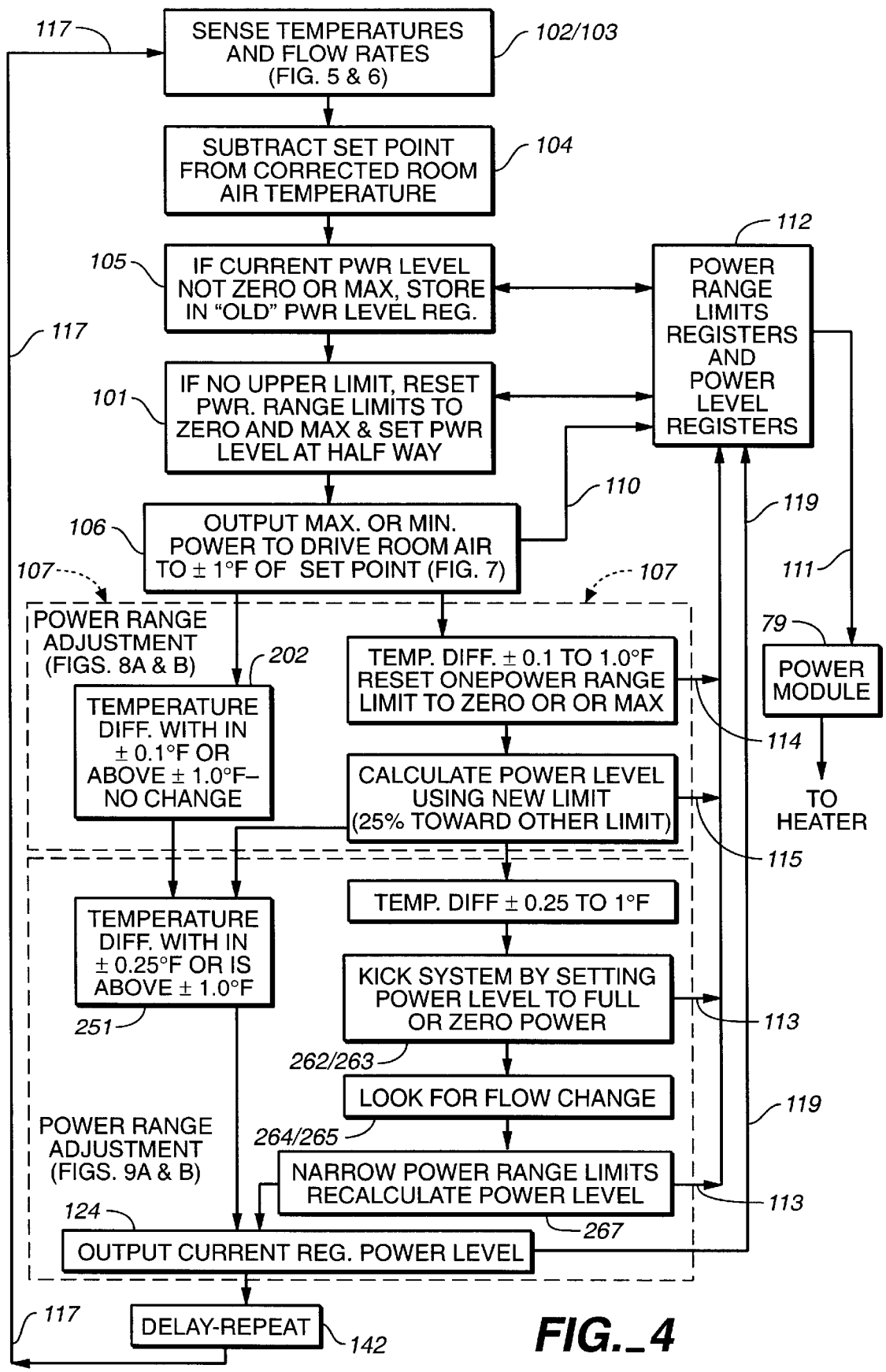
FIG._4

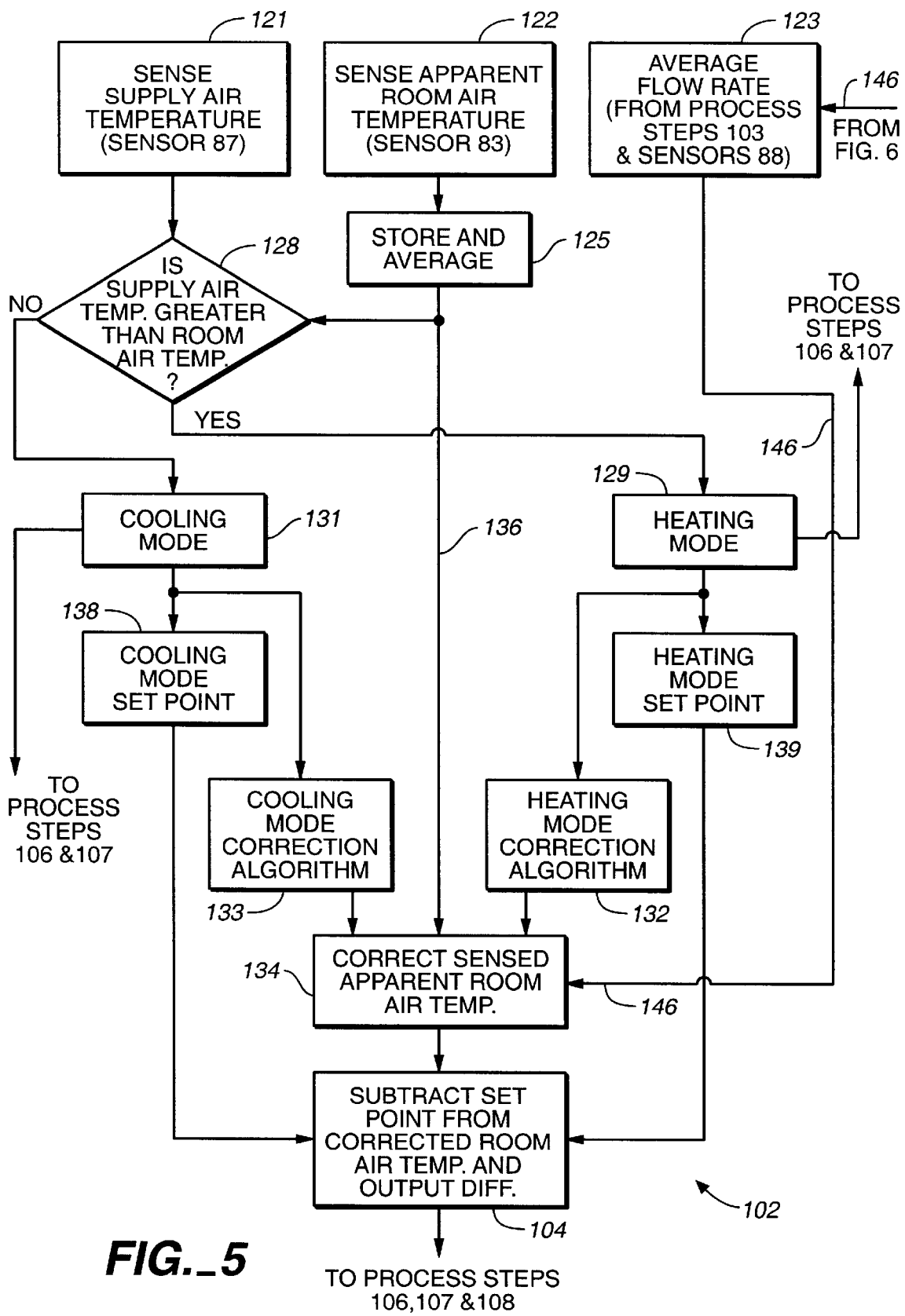
FIG._5

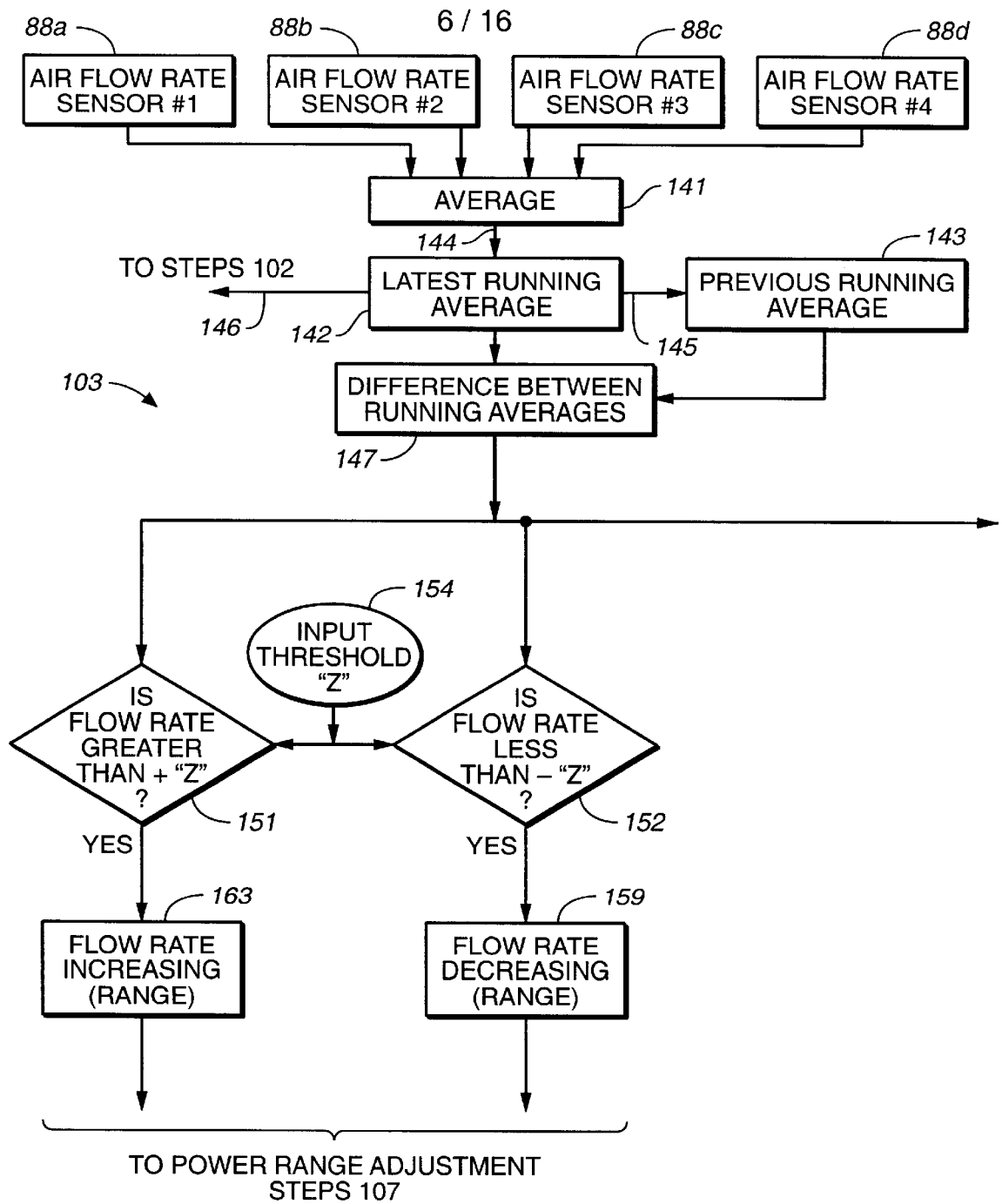
FIG._6A

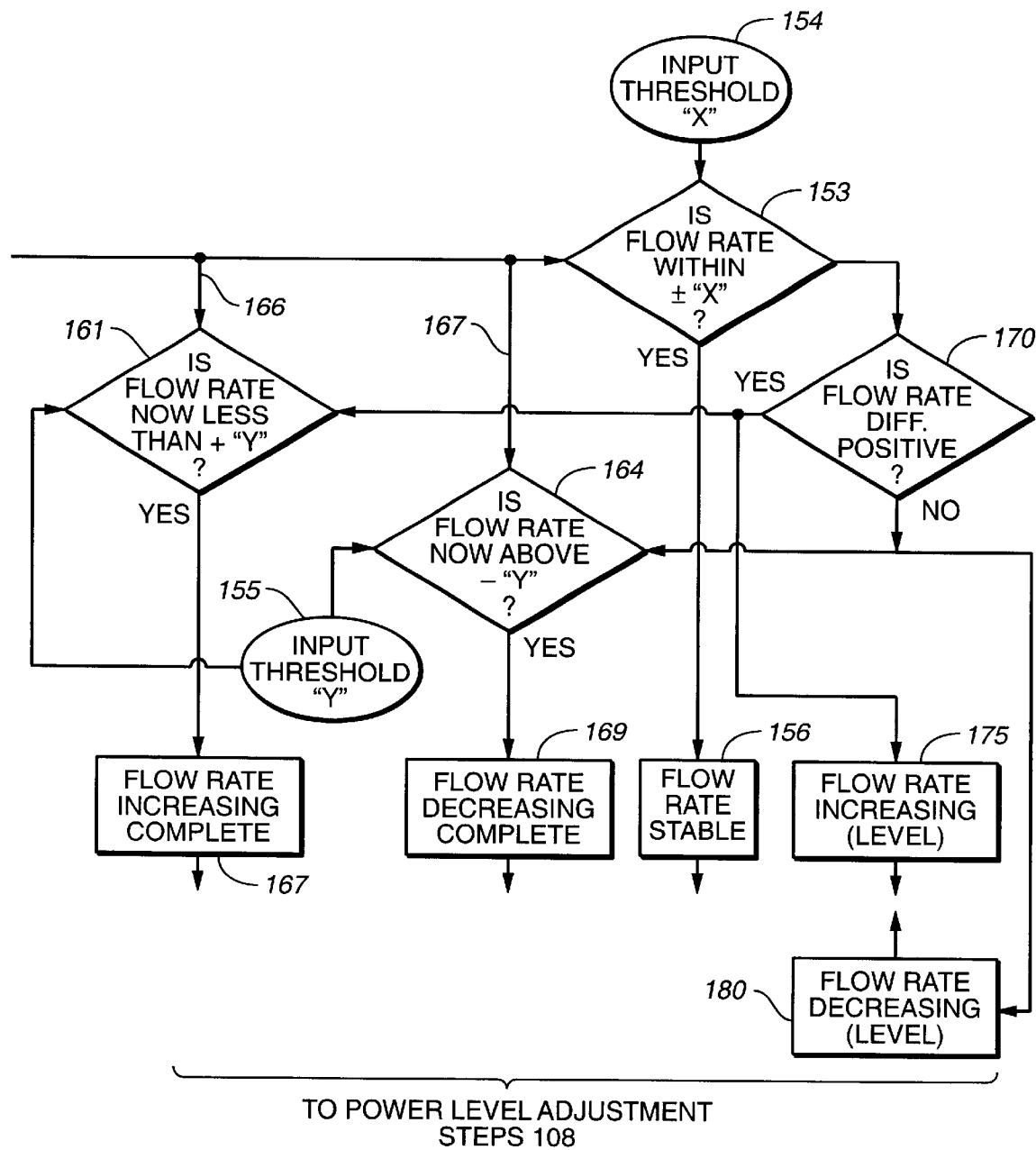
FIG._6B

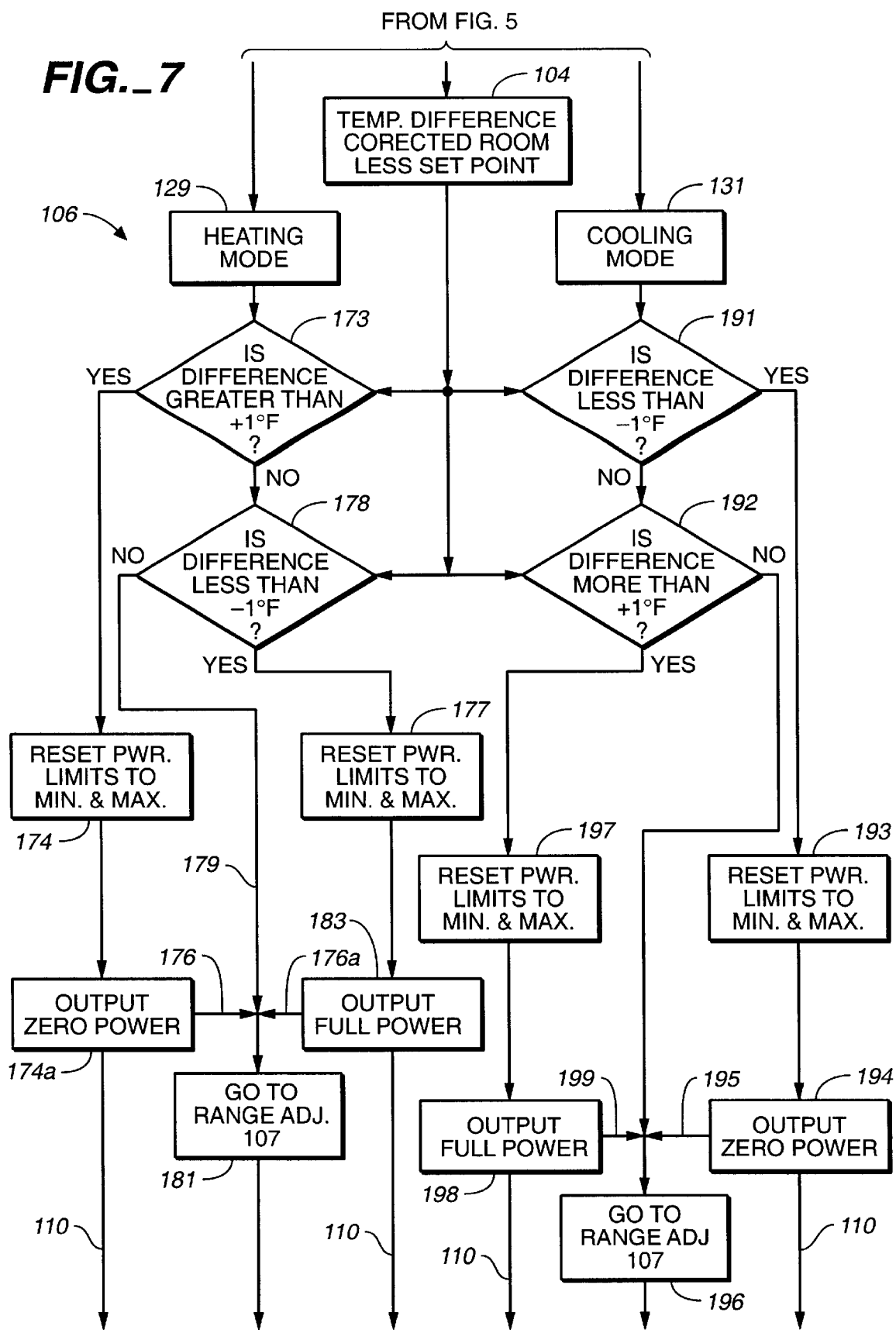
FIG._7

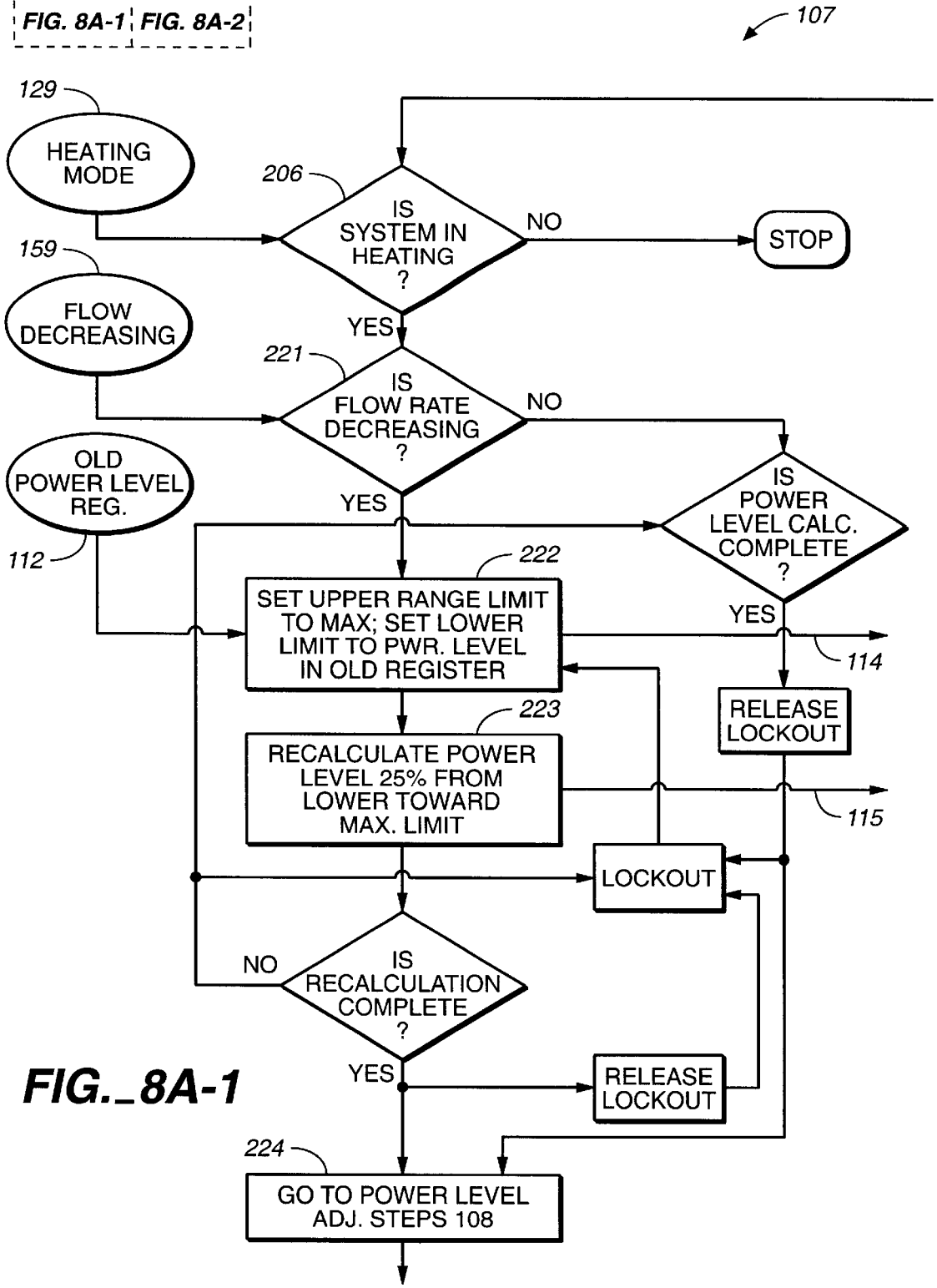
FIG._8A
FIG._8A-1

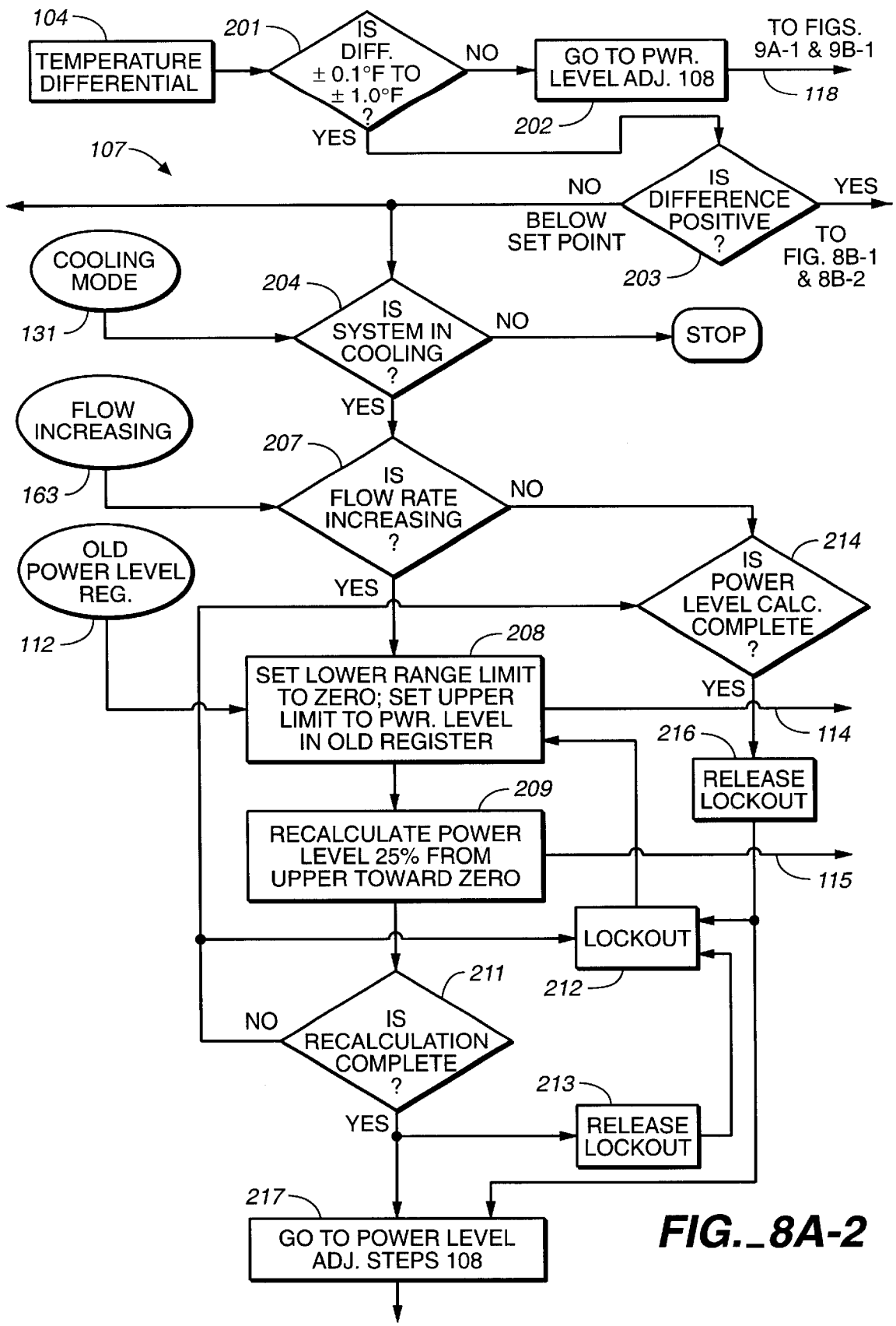
FIG._8A-2

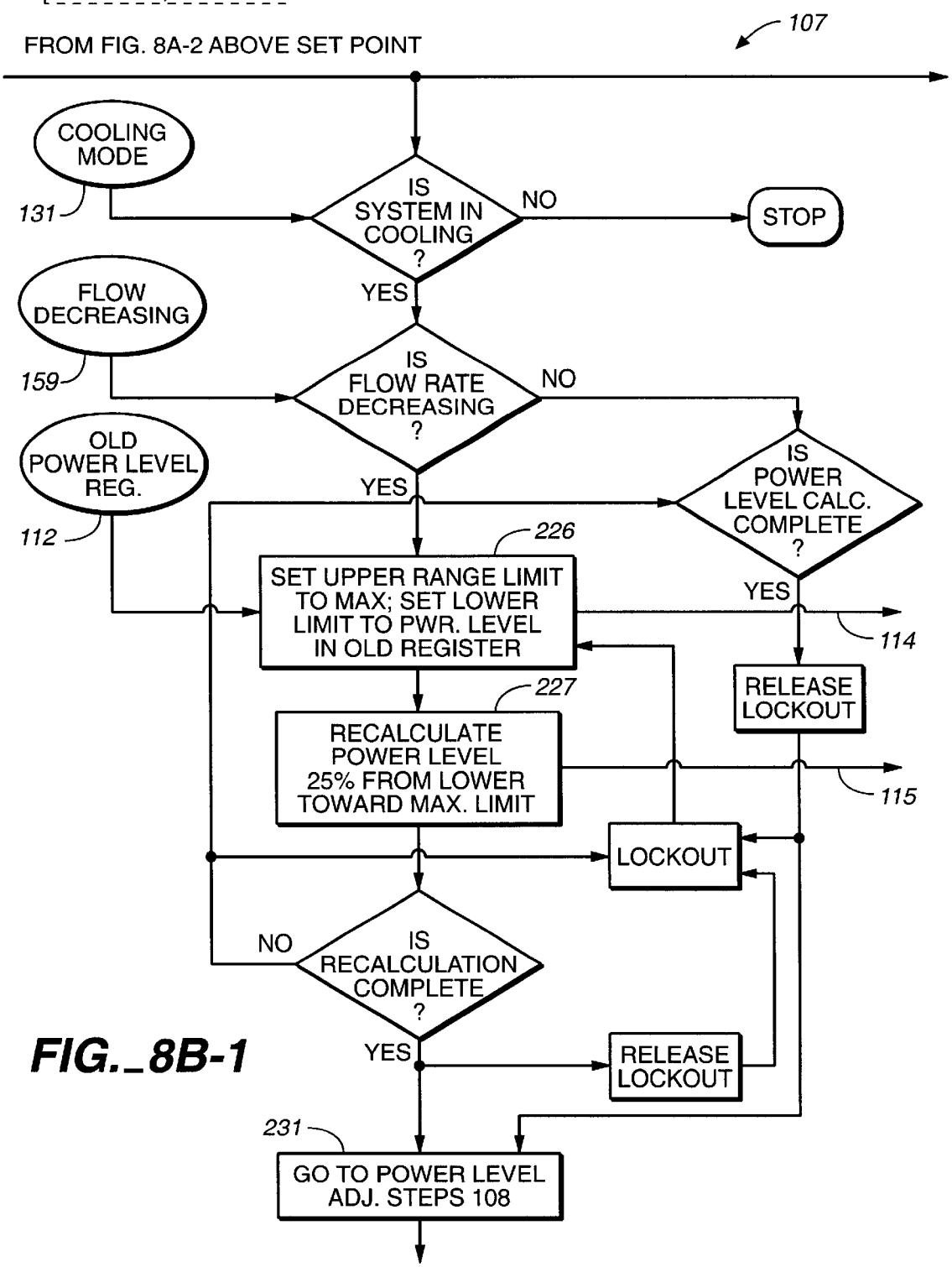
FIG._8B
FIG._8B-1
FIG._8B-2
FIG._8B-1

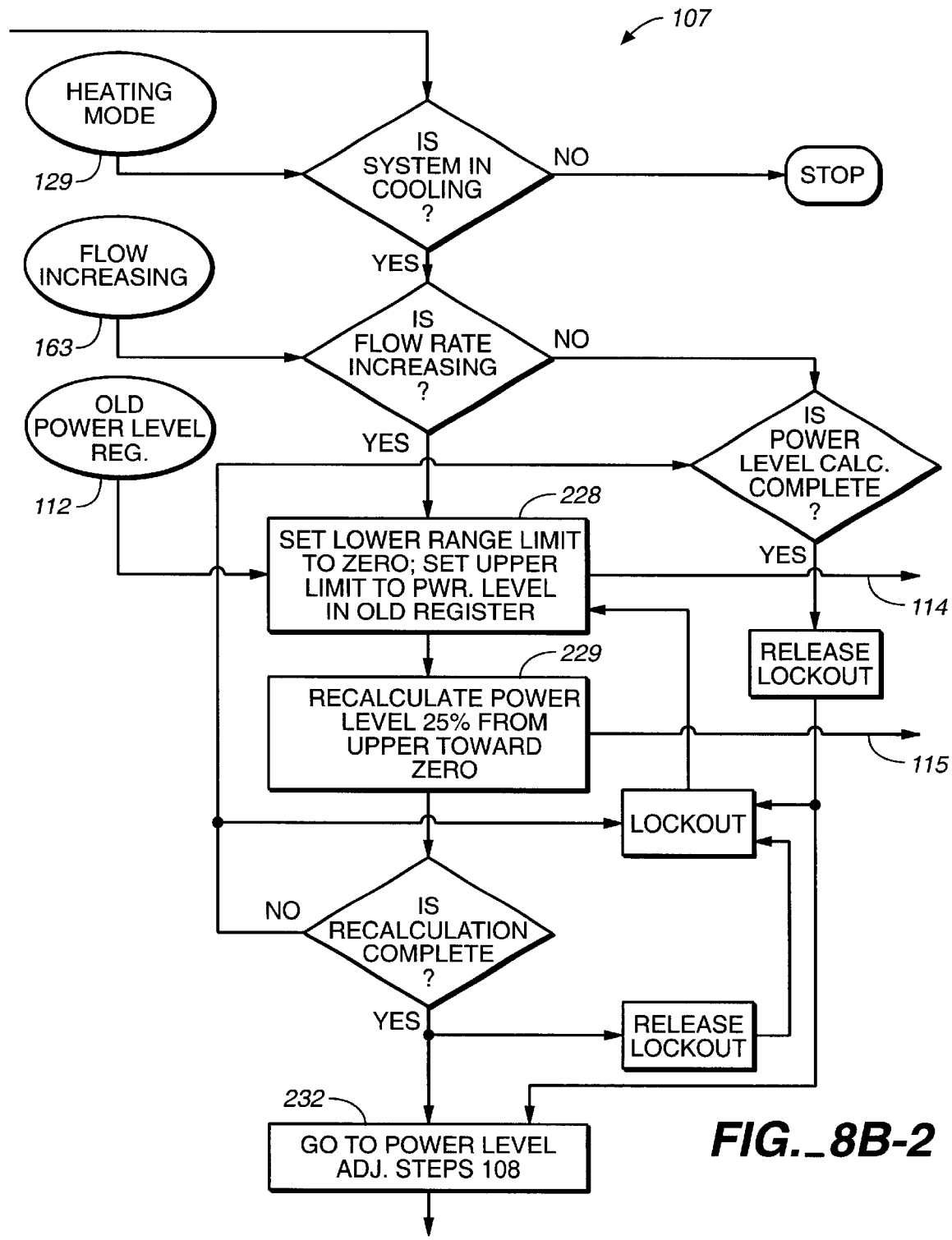
FIG._8B-2

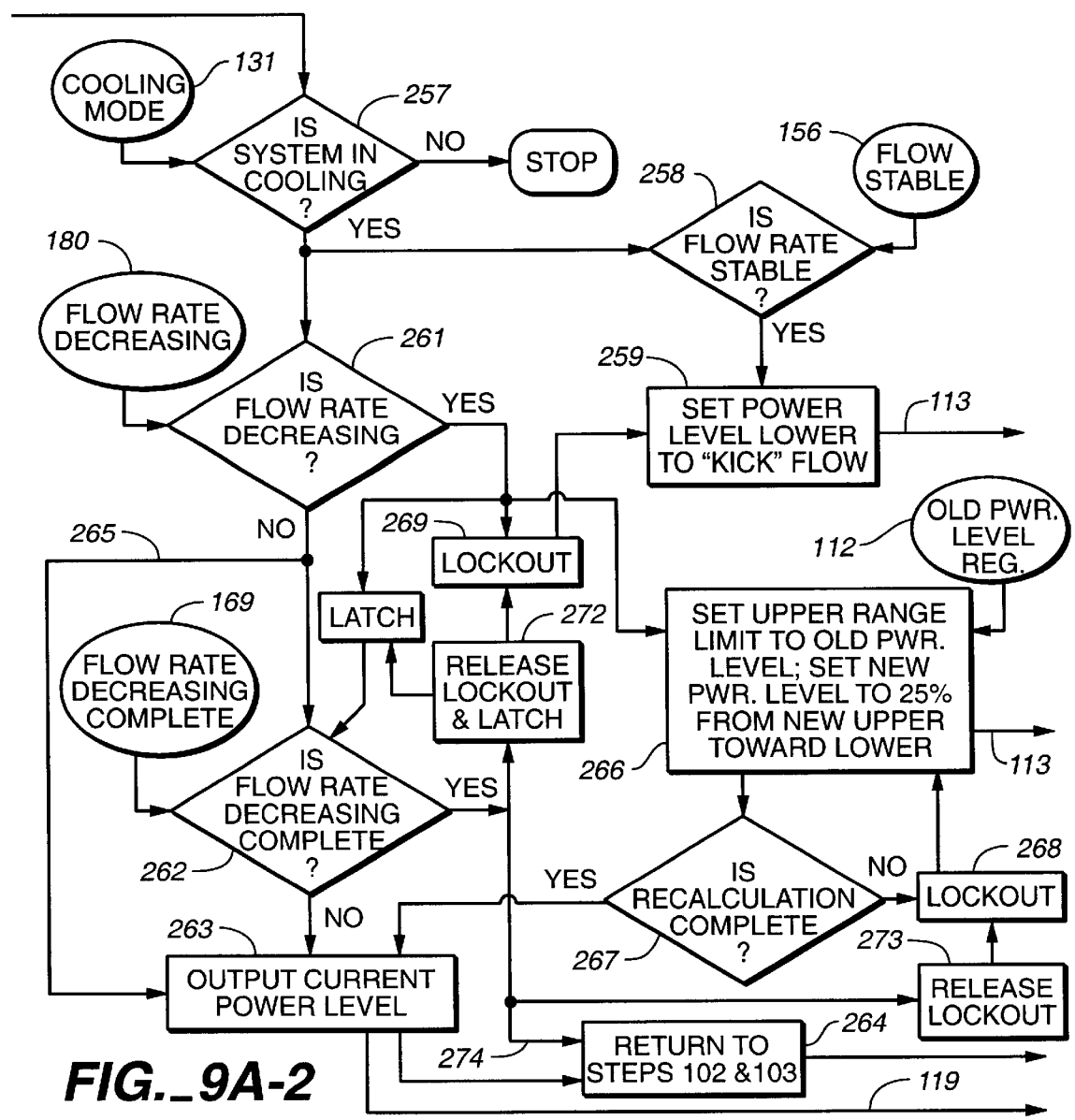

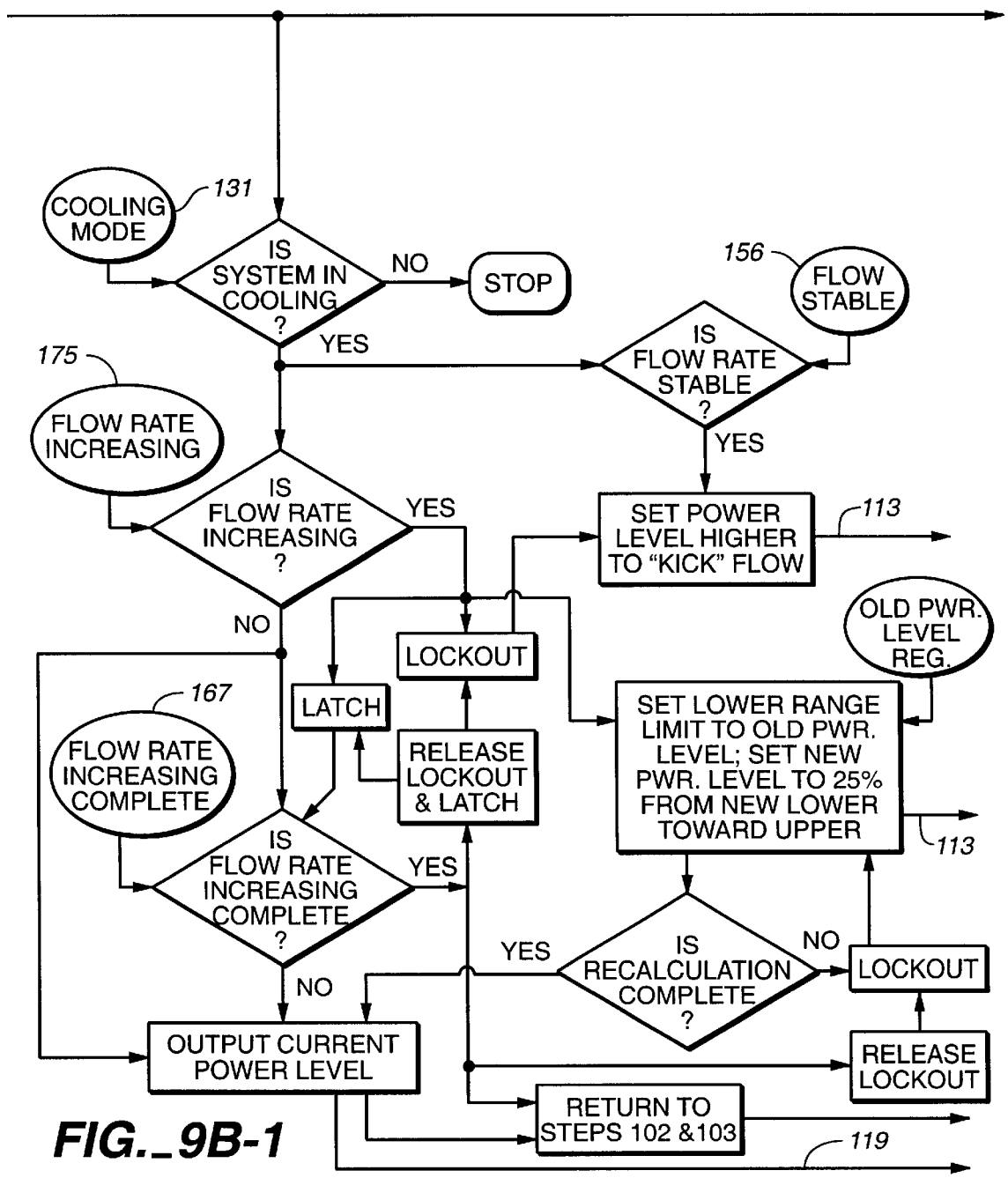
FIG._9B-1

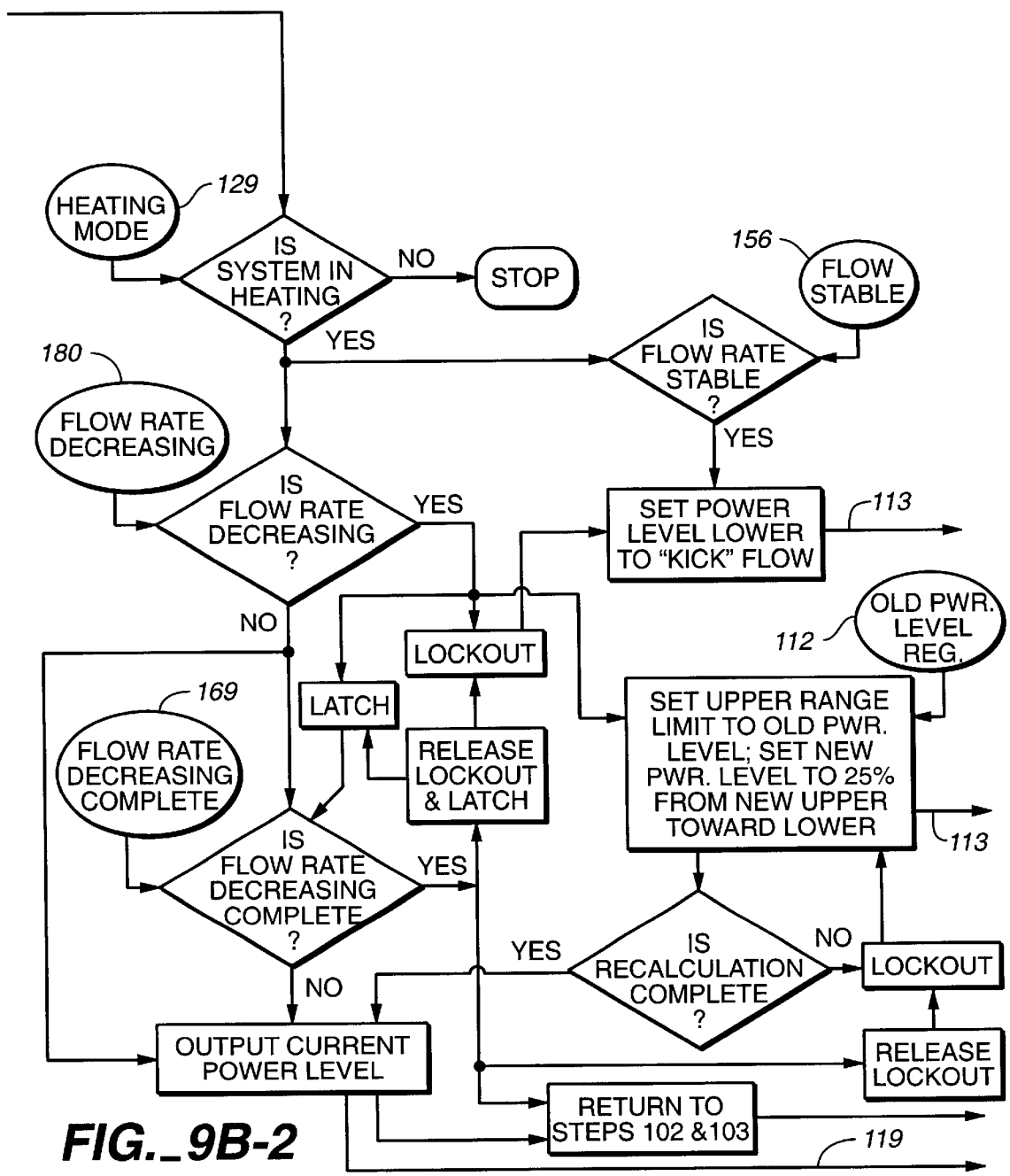
FIG._9B

VARIABLE-AIR-VOLUME DIFFUSER ACTUATOR ASSEMBLY AND METHOD

TECHNICAL FIELD

The present invention relates, in general, to heating, ventilating and air conditioning (HVAC) system and actuators therefor, and more particularly, relates to thermally-powered actuators for variable-air-volume diffusers.

BACKGROUND ART

In variable-air-volume (VAV) diffusers, room air temperature is controlled by varying the volume of supply air which is discharged into a room. The supply air will be heated when the VAV system is in a heating mode and it will be cooled when the system is in a cooling mode. The supply air is usually provided at substantially a constant temperature for each mode. A variable-air-volume diffuser, or an upstream VAV box, is used to regulate the volume of heated or cooled supply air in order to achieve and maintain the desired room air temperature. A central building controller is used to determine whether hot supply air or cool supply air flows from the HVAC air source to the VAV diffusers or box. It is possible, of course, for only cool air or only hot air to be supplied by the system. Thus, in the tropics cool supply air may always be flowing to the VAV diffusers or box.

Three types of actuators for VAV air diffusers and/or VAV duct boxes are in wide-spread use, namely, thermally-powered actuators, pneumatically-powered actuators, and electrically-powered actuators. All three types of VAV actuators are coupled through a mechanical linkage, gear assembly levers or the like to move one or more dampers, vanes, blades, etc., (hereinafter "dampers"), in the air diffuser or the control box upstream of the air diffuser. The damper position across a diffuser discharge opening, or the supply duct in the case of a VAV box, is modulated by a thermally-powered or pneumatically-powered actuator or by an electrical motor in response to sensed room air temperature. Thus, in a heating mode as the room air temperature rises toward the desired or targeted set point temperature, the damper closes down to reduce the amount of supply air being discharged into the room. Conversely, as the room air temperature drops away from the desired or targeted set point temperature, the damper is opened to allow an increase in the amount of warm supply air discharged into the room. In a cooling mode, as the room air temperature rises and moves away from the set point temperature, the actuator opens the damper to allow more cool air to enter the room. As the room air temperature drops toward the set point in the cooling mode, the damper is closed to reduce the volume of cool air discharged into the room.

Various thermal actuators, pneumatic actuators and motor assemblies have certain operating characteristics which favor their selection for particular applications. All of these prior art VAV actuators, however, have deficiencies which, if eliminated, would enhance their performance.

Thermally-powered actuator assemblies, are described in more detail in U.S. Pat. Nos. Re. 30,953; 4,491,270; 4,509, 678; 4,515,069; 4,523,713; 4,537,347; and 4,821,955, which are incorporated herein by reference. Briefly, however, such assemblies will include a containment cylinder or housing filled with a thermally expandable and contractible material, such as a wax which expands or contracts during phase changes. A piston is reciprocally mounted to the containment housing so that the outwardly displaced piston, upon heating and expansion of the wax, can be used to power movement of a damper through a mechanical linkage. Cooling contracts and causes a phase change in the wax, and the piston is drawn into the housing, usually with the aid of a biasing spring.

As will be understood, the piston can be held and the housing allowed to move to drive the damper. Other forms of thermally-powered actuators can include bi-metal elements and memory metals which change shape at selected temperatures.

The response of a typical thermally-powered sensor/actuator can be seen in FIG. 1. A piston displacement versus temperature curve 21 is shown in which the piston is fully retracted at the bottom end of the curve and is fully extended at the top end. Since it is preferable that the piston displacement versus temperature be sensitive, the linkage assembly for most diffuser thermal actuators is constructed so as not to follow displacement curve 21 into either the extreme high or extreme low ends of the curve. Thus, a linear portion of curve 21, namely, the portion defined by legs 23 and 25, can be used to drive the diffuser damper by disengaging the piston from the linkage assembly at leg 22 and by providing an overtravel mechanism at leg 24. This enables a relatively responsive or sensitive relationship to be maintained for controlling diffuser damper opening and closing. A typical actuator piston stroke used for the sensor/actuator is only about 0.1 inch, and the linkage assembly amplifies the stroke to produce longer diffuser damper displacements.

In FIG. 1, a typical sensor/actuator for cooling mode control is shown. Once the sensor senses that the room air temperature induced to flow through the diffuser is below 70° F., no more cool supply air will be discharged into the room because the damper will be closed. As the sensed temperature increases (when the room begins to heat up) from below 70° F., the damper does not open because the diffuser sensor/actuator is now operating on leg 22 of curve 21. The piston displacement is shown as broken line 22a, and it will be disengaged from the damper-driving linkage assembly. As the sensed temperature increases between 71.5° F. to 73° F., however, the thermal sensor/actuator, through the linkage assembly, begins to open the damper until it is fully open at 73° F., which is leg 23 of curve 21. For temperatures above 73° F., the damper will remain in the fully open position as the actuator piston continues to move outwardly against an overtravel mechanism, as indicated by broken line 24a. When the temperature drops to 73° F., the damper remain fully open until the temperature reaches 71.5° F. (i.e., leg 24 of the curve). As the temperature drops from 71.5° F. to 70° F., the damper begins to close, as shown by leg 25 of curve 21. As will be seen, therefore, there is a hysteresis effect in displacement vs. temperature curve 21 of a typical thermally-powered sensor/actuator's response, which effect always opposes a reversal in motion.

In many applications the thermally-powered sensor/actuator assembly hysteresis effect can be tolerated, but in some applications it would be preferable to be able to tailor or modify displacement vs. temperature curve 21 in order to optimize actuator performance. For example, the hysteresis effect could be substantially eliminated by shortening or eliminating legs 22 and 24 of curve 21. Moreover, the sensitivity of the thermal actuator also could be advantageously changed. Curve legs 23 and 25, for example, might be made to be near vertical, so that full displacement of the actuator piston would occur over a very small room temperature, or process variable, change, for example, 0.2 degrees, rather than 1.5 degrees. It is desirable in many applications, for example, to be able to control room temperature to within about 0.5° F. or less.

Still further, the temperature at which the diffuser actuator opens or closes the damper could advantageously be modified or controlled without changing the actuator wax or adjusting the mechanical linkage between the actuator and the displaceable diffuser damper.

Another source of hysteresis in thermally-powered, VAV, diffuser assemblies is the mechanical linkage between the thermal actuator and the movable damper. When a reversal of the direction of displacement of the damper occurs, for example, the cumulative tolerance and friction effects in the diffuser linkage assembly can produce a lag before diffuser damper displacement occurs.

Still another source of performance affecting factors in thermally-powered diffusers is the positioning or location in the diffuser of the sensor/actuator element. In most thermally-powered, VAV diffusers, the thermally-powered actuator also acts as a temperature sensor. Thus, the sensor/actuator of a thermally-powered diffuser is typically positioned in a flow path or channel in the diffuser, through which room air is induced to flow. As the room air flows past the sensor/actuator, the displaceable piston moves, as shown in FIG. 1. The room air sensor/actuator, however, also "sees," or is influenced by, the heating or cooling air in the supply duct. Thus, the supply air temperature is conducted and radiated in varying amounts throughout the diffuser, which is typically made of formed sheet metal components. The temperature sensed by the "room air" sensor/actuator, therefore, is really a combination of the room air temperature, as induced to flow through a diffuser, and the heating or cooling effects of the supply air. The positioning or placement of the thermal sensor/actuator in the diffuser, that is, the distance between the room air sensor/actuator and supply air flow through the diffuser, will influence the temperature sensed and cause it to vary from the actual room air temperature. This effect can be reduced to some extent by insulation and/or partitioning, and it can be compensated for, to some extent, by selection of the actuator wax.

Still other phenomena will change a thermally-powered diffuser's performance from that which might be theoretically predicted. Small amounts of sensor/actuator waxes will diffuse through pores in rubber seals over long time periods. Moreover, supply air duct pressure will vary over short time periods, causing a given diffuser opening size to discharge more or less supply air for any given control or set point.

Additionally, and very importantly, the thermal load in a room or space can vary substantially depending upon the configuration of the room, the presence of heat-generating equipment, the movement of the sun, the coming and going of occupants. Thus, one room may have a thermal response to heating or cooling which varies substantially from another room of similar size, or which varies substantially over the course of a day.

Still further, the thermal mass from time-to-time and room-to-room may vary and will influence the heating or cooling performance required from a diffuser. Thus, over a weekend, the mass of a room may cool or heat to the ambient temperature, requiring considerable time not only to heat or cool the air in the room, but also to heat or cool the mass of the walls defining the room and the furnishings in the room. Since the furnishings and configurations of rooms can vary, the affect of thermal mass on diffuser performance also can vary from room-to-room.

Supply air pressure differentials also will affect VAV diffuser performance. Compensation in VAV control boxes has been attempted by using pressure sensing equipment and elaborate controls to adjust the VAV box discharge rates. Such compensation techniques can solve upstream problems, but they do not solve the downstream problem of unequal pressure drops between the VAV box and the individual damperless diffusers. The air volume discharged at each downstream, damperless diffuser, therefore, will be unbalanced (unequal) by the differences in pressure drop from the VAV box to the various individual diffusers. This is normally "corrected" through the use of pressure-balancing dampers in the supply air duct proximate each diffuser, but such balancing dampers add to the cost and only "balance" the system for one set of conditions, i.e., when the flow rates change, the system becomes unbalanced again.

Many of the problems above-enumerated in connection with thermally-powered VAV diffusers will apply with equal force to other thermally-powered actuator systems. Thus, when a thermal actuator is used to open and/or close a valve in a fluid system, hysteresis effects, speed of response, actuator positioning (if it also acts as a sensor) and pressure variations in the fluid being controlled by the valve can all influence operation of the system.

Many of these same problems, or analogous problems also exist in VAV diffuser systems which are driven by electric motors. Since motors reverse electrically with little internal friction, hysteresis losses or effects are not significant in electrical motors. Hysteresis-like effects can occur in the diffuser system as a result of a "dead band" in the thermostat controlling the motor. Moreover, gear-based or lever-based damper opening mechanisms coupled to the electrical motor can exhibit hysteresis effects on motion reversals, which are analogous to hysteresis losses in linkages in thermal diffusers. The thermal response differences from room-to-room or time-to-time in a given room are also of concern when motor-driven VAV diffusers are employed, as are supply duct pressure variations. Since the speed of an electric motor response is constant, but it can be either too fast or too slow. Thus, electric motor powered systems also can have problems with constant "hunting" about the set point temperature due to over-responsive or under-responsive performance.

Prior art VAV diffuser or VAV box systems have attempted to address the above-noted problems only in a general manner. There are VAV systems which are known to have one or all three functions of proportional-integral-derivative ("PID") operation control characteristics. See, e.g., "PID Proportional-Integral-Derivative Control," ENGINEERED SYSTEMS, July/August 1987.

Any VAV system in which the response, i.e., damper opening or closing, varies as a function of the input, the sensed temperature, is a "proportional" system. For example, the linear responses of legs 23 and 25 in FIG. 1 show a damper blade displacement which is proportional to the sensed temperature.

Many VAV systems have gone further in that they control damper displacement to reduce the VAV system offset, namely, they attempt to prevent the room air from stabilizing on a temperature which is offset from the set point room air temperature. This is considered to be an "integral" control technique because an integrative term sums the offset error over time and uses the sum as a basis for an additional control signal to reduce the offset and eventually eliminate it.

Finally, some systems also control damper movement so as to reduce thermal overshoot and reduce system hunting, that is, cyclic heating of the room above and below or cyclic cooling of the room below and above, the target or set point room air temperature. This is described as a "derivative" function of the controller in that it anticipates temperature rise or fall as the target temperature is approached and slows the same so as to damp-out thermal overshoot.

When PID controllers for VAV diffuser systems have been employed, they basically operated damper opening in accordance with a transfer function based upon a fixed model which governs the system's performance. Such models are usually established at a test facility in which various "nominal" room physical characteristics are assumed and used to create the desired proportional (P), proportional-integral (PI), or proportional-integral-derivative (PID) diffuser response. All diffusers are then manufactured with the algorithm suitable for the "nominal" room.

Predictably, there are few nominal rooms, and few rooms remain in a "nominal" thermal demand state for very long. It is further known, however, that such P, PI or PID controllers can be manually field-adjusted or "tuned" to accommodate differences in the actual room from those of the test or nominal room. Even this refinement, for example, a tunable PID control system, does not solve the problem of thermal demand variations. When furnishings are added or subtracted from the room, or when occupancy changes, or when equipment is brought into the room, or when rapid changes in sun exposure occur, or as the thermal mass is being brought up or down to the desired temperature, the diffuser operates using the same fixed transfer function between sensed temperatures and resulting damper positions.

Thus, PID systems work well in some spaces, as long as conditions in the space do not change radically, because they tend to have to be tuned to control inside a tight control parameter envelope. If the room conditions fall outside the control envelope, however, PID systems often lose their ability to drive the room temperature back inside the control envelope within a reasonable time period, if at all.

In motor driven VAV systems, PI or PID controllers have simply been achieved using a motor controller having the desired control function output and a temperature sensor such as a thermostat. The motor controller drives the motor in accordance with the PID transfer function in response to the room temperature sensor input.

For thermally-powered VAV diffuser systems, a resistance heater has been mounted to the thermal sensor-actuator containment housing and an electrical controller has been used to control operation of the heater in response to a separate room air temperature sensor. What once was both a sensor and an actuator is now only a thermal actuator and displacement of the movable piston in the actuator is controlled by the heater controller, which again responds based upon a fixed transfer function stored in the controller. An example of a PI system for a thermally-powered, VAV diffuser, is the system manufactured by Titus Division of Tomkins Industries of Richardson, Tex., which system is sold under the trademark Z-COM.

The problem with PI VAV systems can be that the system constantly hunts for the set point as the PI algorithm drives it too fast past the set point in both directions or moves too sluggishly toward the set point. Also PI systems cannot change their response time nor anticipate. Thus, they are best for applications in which the load changes are small and therefore the instability or hunting is small.

While not conventionally the case, refrigerants also could be used, instead of a heater, to produce piston displacement in a thermal actuator.

It is also known in large or sophisticated prior art HVAC systems, to employ controllers which are capable of modifying the performance of the system based upon past experience, i.e., "adaptive" or self-modulating systems. Generally, the cost and complexity of such controllers has made their use with individual VAV diffusers prohibitive. Moreover, such adaptive systems have not been integrated to control thermally-powered sensor/actuators.

As used herein, the expression "adaptive" shall mean the ability of a control system to learn from experience and modify its control behavior in a manner emulating characteristics of the human brain. Generally, such adaptive control systems will take the form of "expert systems," "fuzzy logic systems," "planning systems," "neural networks" or "genetic algorithms," as such terms are used and defined in THE CONTROL HANDBOOK, Sections 57.9 to 57.11, 994–1030 (1996).

Accordingly, it is an object of the present invention to provide a VAV diffuser apparatus and method which are based upon use of a thermally-powered actuator and yet are adaptive so as to enable the control function of the system to be changed over time upon sensing the response of desired ambient parameters.

A further object of the present invention is to provide an adaptive, thermally-powered VAV diffuser which is sufficiently low in cost so that it can be used in every VAV diffuser of a multi-diffuser HVAC system.

Another object of the present invention is to provide an adaptive VAV diffuser and method in which hysteresis effects can be changed or eliminated, the speed of diffuser response can be controlled, and the effect of supply air temperature on diffuser response can be changed or eliminated.

Another object of the present invention is to provide a VAV diffuser in which supply air duct pressure variations can be compensated for so that a pressure-independent VAV diffuser can be achieved.

Another object of the present invention is to provide a diffuser assembly and method having a flow sensing capability so as to allow greater compatibility with large building management HVAC systems.

Still another object of the present invention is to provide a low-cost, adaptive, VAV diffuser and method which is suitable for use with motor-driven diffusers.

Another object of the present invention is to provide a thermal actuator assembly in which hysteresis effects can be controlled or modified to produce a wide range of actuator responses suitable for use in systems other than HVAC diffusers.

Another object of the present invention is to provide a VAV diffuser assembly which can adapt to variations in thermal mass and load.

Another object of the present invention is to provide an adaptive VAV diffuser assembly which is durable, easy to install and adjust in the field, and has interoperability, i.e., can be easily adapted for coupling (plug and play) to complex building management systems.

The VAV diffuser assembly, thermally-powered actuator and method of the present invention have other objects and advantages which will be come apparent from, or are set forth in more detail in, the following Best Mode of Carrying Out the Invention and the accompanying drawing.

DISCLOSURE OF INVENTION

The apparatus of the present invention comprises, briefly, a thermally-powered actuator assembly with an actuator having a movable element displaceable in response to temperature changes, a heating assembly thermally coupled to the actuator in a position to apply heat to the actuator to produce movement of the movable element, a control device connected to the heating assembly and having an adaptive circuit formed for control of the operation of the heating assembly in response to input signals, at least one sensor formed to sense a desired parameter and connected to the adaptive circuit for communication of input signals to the control device, and the control device further being formed to periodically sample input signals from the sensor to adaptively modify operation of the heating assembly over time, and thus operation of the actuator, in response to the sampled sensor input signals.

In the most preferred embodiment, the actuator assembly is used to power a variable-air-volume diffuser with the movable element positioned to effect displacement of a damper which controls the discharge of supply air from the diffuser assembly into a space or room. The sensor can be provided by a room air temperature sensor, but most preferably it also includes a supply air temperature sensor and a supply air flow rate sensing assembly. The adaptive control circuit controls operation of the actuator and therefore movement of the damper in response to input from the various sensors so as to adaptively vary the volume of supply air discharged from the diffuser in response to sensed room air temperature.

Another aspect of the present invention, a method of controlling the operation of a variable-air-volume diffuser is provided which is comprised, briefly, of the steps of controlling the movement of an air flow-modulating damper in the diffuser using a movable actuator assembly; controlling movement of the actuator assembly by an adaptive control assembly coupled to the actuator assembly; periodically sensing a parameter of a space into which the diffuser is discharging supply air with a sensor coupled to the adaptive control assembly; and modifying operation of the actuator assembly with the adaptive control assembly in response to periodic sensing of the parameter when the parameter responds in a manner different from an optimal response.

Preferably, the present method also includes the steps of sensing the supply air discharge flow rate, as well as room air temperature, and adjusting the damper position in a direction driving room air temperature toward a relatively narrow target temperature control range when the discharge flow rate is in a relatively stable flow rate range. An adjustment in damper position is made and the discharge flow rate is monitored until it becomes stable again, at which point the room air temperature is sensed and a further adjustment in damper position made, if required. Most preferably, the method further includes the step of driving the room air temperature into a broader or gross temperature control range by a substantially fully opened or substantially fully closed damper position prior to driving said room air temperature toward said relatively narrow target control range.

In still a further aspect of the present invention, a variable-air-volume diffuser and method are provided which include an electrical control circuit configured to control discharge of supply air at a flow rate which is substantially independent of changes in the pressure of the supply air supplied to the diffuser assembly.

Additionally, the present invention includes a method and apparatus for correction of the room air temperature sensed at the variable-air-volume diffuser. Briefly, the apparatus includes a supply air temperature sensor formed for mounting of a location sensing the temperature of supply air passing through the diffuser, a room air temperature sensor formed for mounting at a location for sensing the temperature of room air proximate to the diffuser, and a correction assembly coupled to the room air temperature sensor and the supply air temperature sensor and responsive thereto to produce an output correcting sensed room air temperature by amount based upon the influence of supply air temperature on the sensed room air temperature. In the most preferred form, the temperature correction assembly further includes an air flow rate sensor which is used in combination with the supply air temperature sensor to effect correction of the room air temperature sensor. The correction assembly further can provide an empirically determined correction for air temperature stratification in the room.

In the adaptive circuits used to control the actuator for the diffuser systems of the present invention, it is most preferred that an expert system electrical circuit be employed, but other adaptive circuits also are suitable, including neural network circuits, fuzzy logic system circuits, planning system circuits and genetic algorithm circuits.

BRIEF DESCRIPTION OF THE DRAWING

FIG. 2 is a side elevation, half section view of schematic representation of a typical prior art variable-air-volume diffuser assembly.

FIG. 3 is a side elevation, half-section view corresponding to FIG. 2 of a schematic representation of diffuser assembly constructed in accordance with the present invention.

FIG. 4 is an overall process flow diagram mapping the portions of the process implemented by an adaptive electrical control circuit suitable for use in controlling the operation of the diffuser assembly of FIG. 3.

FIG. 5 is a portion of the overall process flow diagram mapped in FIG. 4 showing the room air temperature correction steps.

FIG. 6 is a portion of the overall process flow diagram mapped in FIG. 4 showing the supply air flow rate process steps.

FIG. 7 is a portion of the overall process flow diagram mapped in FIG. 4 showing the initial or out-of-range temperature correction steps.

FIG. 8A is a portion of the overall process flow diagram mapped in FIG. 4 showing the further heater range limit adjustment steps for the heating mode.

FIG. 8B corresponds to FIG. 8A and shows the heater range limit adjustment steps for the cooling mode.

FIG. 9B corresponds to FIG. 9A and shows the power level adjustment steps for temperature below the set point temperature.

BEST MODE OF CARRYING OUT THE INVENTION

Figures 1, 9A:
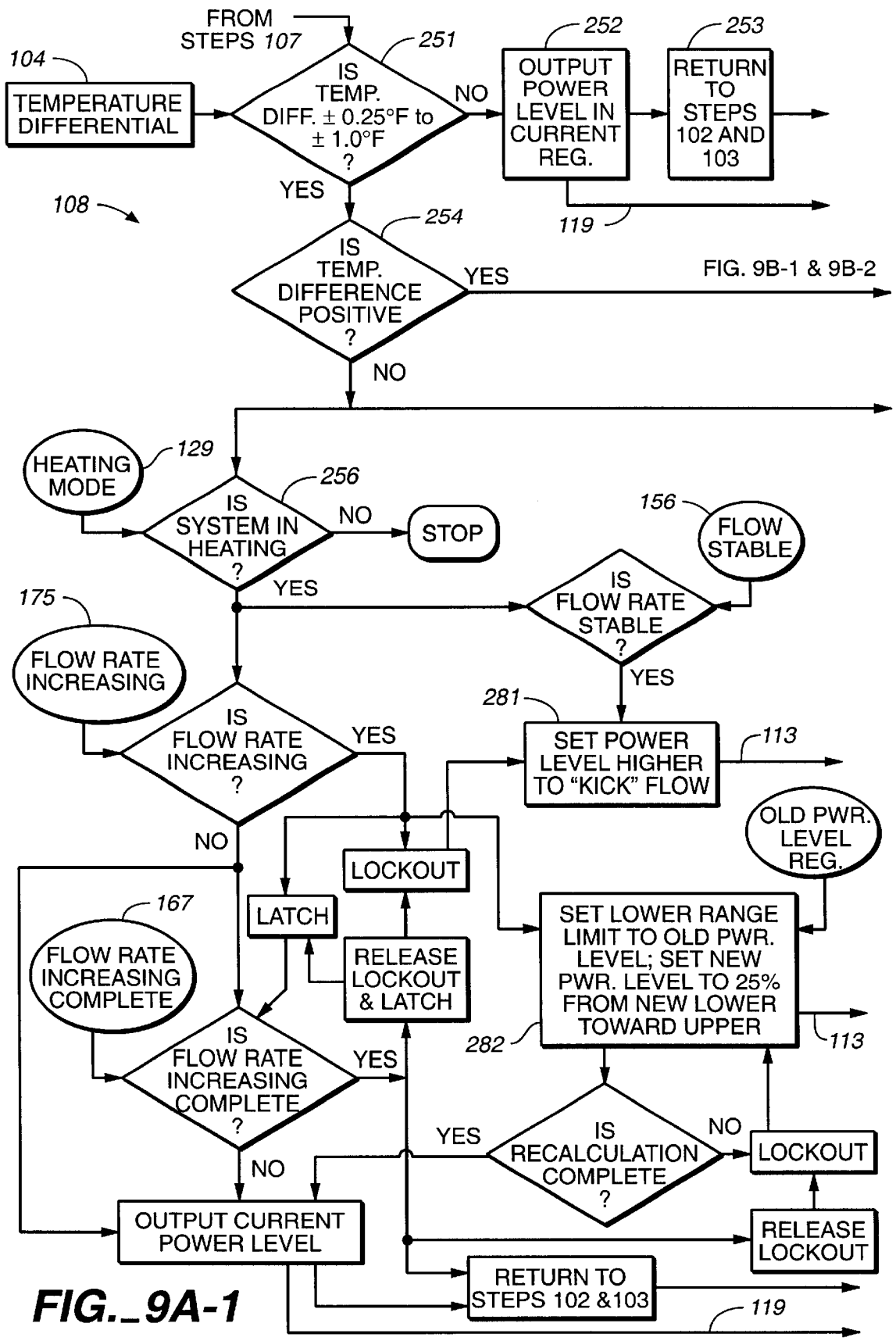
FIG. 1 is a stroke versus temperature curve for a typical prior art thermal sensor-actuator assembly illustrating actuator hysteresis.
FIG. 9A is a portion of the overall process flow diagram mapped in FIG. 4 showing the power level adjustment steps for temperature above the set point temperature.

The most preferred embodiment of the present invention is a variable-air-volume diffuser which is adaptively controlled to respond to sensed room air temperature so as to intelligently and autonomously control the volume of supply air discharged into a room or space. The present invention, however, has applications beyond HVAC systems. Thus, an actuator which is adaptively controlled using the teaching of the present invention can be applied, for example, to the operation of valves for the control of the flow of liquids.

Similarly, the present invention is most preferably directed to the control of wax-based thermal actuators, but it also may be used to adaptively control the operation of other thermal actuators, such bimetallic or memory metal thermal actuators, and to control the operation of non-thermal actuators such as electric motors, piezo-electric actuators, pneumatic actuators and hydraulic actuators, among others.

As seen from FIG. 1, thermal actuators conventionally have hysteresis. The control system of the present invention can reduce, modify and otherwise tailor such hysteresis so as to produce actuator operation that is substantially as desired. Electrical motor actuators typically will not have the same hysteresis problems of thermal actuators, but often they are coupled to mechanical linkage assemblies. Such linkage assemblies will contribute hysteresis effects from both friction and tolerance losses between parts.

While the following description of the best mode features variable-air-volume diffusers which are driven by thermally powered actuators, it will be understood that the thermally powered actuator alone, as well as non-thermally powered actuators, can benefit from many aspects of the present invention.

Referring now to FIG. 2, a schematic representation of a typical variable-air-volume diffuser assembly, generally designated 41, is shown. The diffuser assembly includes a thermally-powered actuator 42 which is operatively associated with a mechanical linkage assembly 43 that, in turn, is operatively associated with at least one movable damper 44. Damper 44 controls the discharge of supply air from the diffuser into the space or room to be heated, cooled or ventilated. As shown in FIG. 2, a movable damper element 44 is provided on both sides of the diffuser. In fact, since FIG. 4 is a half section view, damper elements 44 would be provided on all four sides of a square diffuser, as more fully described and set forth in U.S. Pat. Nos. Re. 30,953, 4,491,270 and 4,523,713. The above-referenced prior art diffusers, however, employ thermal actuators which also function as temperature sensing assemblies. In the present invention, the temperature sensing function of the thermally-powered actuator is essentially not employed.

It is, however, known in the prior art to employ an electrically powered resistance heating element in combination with thermally-powered actuators so as to control the operation of the actuator. Thus, as shown in FIG. 2, electrical heating element 46 is thermally coupled to actuator 42 and is electrically connected to a power module 47 and a controller 48, as indicated schematically by arrows 49. In the preferred form, resistance heater 46 can be bonded or otherwise affixed to the exterior of actuator housing 51, but it also could be placed proximate the actuator, or even inside the actuator housing, so as to be in a position to transfer heat to the wax or other expandable (phase-change) material contained in housing 51.

Extending outwardly from actuator housing 51 is a piston or movable element 52, which most typically is resiliently biased inwardly by a biasing spring (not shown) so as to retract into housing 51 upon contraction of the expandable wax.

Power module 47 can be a source of electricity, most likely a 24 volt source,(e.g., a battery, or a transformer coupled to building power) which powers heater 46. Power module 47 can have a variable or pulse-width modulated output which is either the stepped or infinitely variable to adjust either the current or voltage of the electrical source. Such power modules are well known to those skilled in the art, and will not be described in more detail herein.

Control circuit or controller 48 is electrically coupled to control operation of power module 47 and can vary in its construction. In the prior art it typically provides proportional control (P), proportional and integral control (P-I) or proportional, integral and derivative control (P-I-D). PID electrical control is probably the most sophisticated in that it provides a proportional response that does not have an offset and is damped against overshooting. A PID control circuit can be "tuned" to its application, but it is not always possible for it to control in a stable manner under changing room conditions, as described above.

Mechanical linkage assembly 43, which is driven by movable piston 52, can take numerous forms. U.S. Pat. Nos. Re. 30,953, 4,491,270, 4,515,069 and 4,523,713 all disclose mechanical linkage assemblies of the type suitable for driving variable-air-volume diffuser dampers. Such mechanical linkage assemblies 43 inherently will have friction and tolerance variances which cause hysteresis losses that are superimposed on the hysteresis effects present in actuator 42. In prior art variable-air-volume diffusers, therefore, both the hysteresis of actuator 42, and the hysteresis of linkage assembly 43 will affect the response of the damper to attempts by control circuit 48 to control operation of the diffuser.

Controller 48 typically receives input from two temperature sensors so as to enable its control of actuator 42 and thus damper 44. A room air temperature sensor 53 and a supply air temperature sensor 54 are connected, as shown schematically by arrows 56, to controller 48. Supply air temperature sensor 54 most usually will be mounted in neck portion 57 of diffuser housing 58, but the supply air temperature sensor also may be mounted in supply air duct 58 to which the diffuser housing is coupled. Room air temperature sensor 53 most typically will be mounted somewhere inside diffuser housing 58, for example, behind an appearance panel 61 in a flow path or flow channel 62 through which room air is induced to flow, either by induction nozzles or as the result of the flow of supply air out of the diffuser, in a manner well known in the prior art. Room air temperature sensor 53 can also be mounted externally of the diffuser housing, and it can even take the form of a wall-mounted thermostat which is electrically coupled to control circuit 48.

A disadvantage of using a room air temperature sensor mounted to diffuser housing 58 is that the supply air passing through the diffuser assembly will influence the temperature sensed by sensor 53. Moreover, since diffusers are most typically mounted in the ceiling of a room, the room air induced to flow through, or proximate, diffuser housing 58 will tend to be taken from the warmer room air proximate the ceiling. Thus, another problem commonly encountered in the accurate control of the volume of air discharged from a variable-air-volume diffuser is the combined effects of supply air influence and room air stratification on the apparent room air temperature which is sensed by sensor 53.

Referring now to FIG. 3, a diffuser assembly, generally designated 71, constructed in accordance with the present invention is schematically shown. Diffuser 71 includes a thermally powered actuator 72 having a movable element or piston 73 mounted therein and displaceable in response to temperature changes. A heating assembly 74 is thermally coupled to actuator 72 in a position to apply heat to the actuator, and particularly to the expandable wax, or other material, contained within actuator housings 76. As above noted, heater 74 most preferably is bonded to the outside of housing 76, but it can be internal or in a position radiating heat to housing 76.

A control device or controller 77 is connected, preferably electrically connected as indicated schematically by arrows 78, to a power module 79 and heater 74. Control device 77 in the present invention includes an adaptive electrical circuit formed for control of the operation of heater assembly 74 in response to input signals from at least one sensor. As will be understood, in other embodiments control device 77 may be provided as an adaptive pneumatic or an adapter hydraulic circuit which is used to control an actuator or a motor.

Movement of displaceable piston or movable element 73 can be transmitted to a damper assembly 80 through diffuser linkage assembly 81. Such linkages are well known in the art and will not be described in detail herein.

In the form of variable-air-volume diffuser 71 illustrated in FIG. 3, a plurality of sensors are input to adaptive controller 77. In this case a room air temperature sensor 83 is mounted in a room air flow path or channel 84 in diffuser housing 86. A supply air temperature sensor 87 and a supply air flow rate sensor assembly 88 also are provided, both of which preferably are mounted in diffuser neck 89. One or both of sensors 87 and 88 may optionally be mounted in supply air duct 91. Sensors 83, 87 and 88 are all connected, preferably electrically connected as schematically indicated by arrows 92, to adaptive controller 77.

In the improved variable-air-volume diffuser illustrated in FIG. 3, controller 77 is further formed to periodically poll or sample input signals from sensors 83, 87 and 88 and to adaptively modify operation of heating assembly 74 over time in response to the sampled input signals so as to control the movement of damper assembly 80. This damper movement, in turn, causes the amount of supply air discharged through the diffuser into the space or room being heated, cooled or ventilated to be varied. Moreover, unlike prior art systems, the adaptive electrical control circuit of the present invention will adapt from the sensed inputs so as to respond in a way which allows much more accurate control of the volume of supply air discharged into the room.

Adaptive control device 77 and heater 74 also can be used to modify or overcome the hysteresis effects of the thermally-powered actuator assembly 72, the speed of response of the thermally powered actuator assembly, the hysteresis effects of mechanical linkage 81, the ambient influences on sensor assembly 83, the variations in the sensed temperature by sensor 83 from the desired response of room air temperature, and the ambient influences on actuator assembly 72. The present adaptive circuit 77 also can accommodate thermal mass changes and thermal load variances.

Still further, adaptive controller 77 can be electrically connected, as indicated by arrow 93, to a building management HVAC central controller 101, which also can act as a user input device, to provide what is known in the industry as "interoperability." Diffuser 71 can be "plug and play" compatible with large system building central controllers by providing an interface with the programming language used by the central building management controller.

Adaptive controller 77 includes control circuitry which will implement an adaptive control process as described below. The most preferred circuitry is an electrical circuit which employs a programmable integrated circuit chip, such as the NEURON chip manufactured by Toshiba Electric of Irvine, Calif. The NEURON chip has three microprocessors on it, one for communications, one for memory management and one for implementing the adaptive program described below. The program-implementing microprocessor is augmented by a flash EPROM memory, or similar external memory, such as the EPROM manufactured by Atmel under Part No. AT 29C257. The communications microprocessor allows communication on a network with LONTALK protocol for communications, for example, with a building management computer. It will be understood that other programmable integrated circuit chips can be employed to implement the present invention.

Described below in detail is an expert system circuit which includes process steps that can be programmed and down-loaded onto the NEURON chip, but it will be understood that the adaptive circuit of the present invention also could be implemented using a neural network circuit, a fuzzy logic system circuit, a planning system circuit and a genetic algorithm circuit. The NEURON chip, however, is a relatively low-cost circuit component (for example, $5.00 or less) which is readily mounted in the diffuser housing so as to enable control of the operation of the diffuser in a highly effective manner, as described below.

Overall Control Process

On a broadest logic level, the present control process operates as follows. Controller 77 causes damper assembly 80 to move to a substantially fully opened or substantially fully closed position in order to drive the room air temperature to within a gross temperature control range around the set point temperature. These steps are shown as steps 106 of FIG. 7.

The gross temperature control range should be large enough so that driving the room air hard, or as rapidly as possible, toward the set point temperature will not drive the room air temperature completely across the gross temperature control range. The gross temperature control range, however, is preferably small enough that fine adjustments to the damper position once within the gross range will enable the room air temperature to be driven, without too much delay and without too big an overshoot, into a narrower target control temperature range. For the preferred diffuser embodiment of FIG. 3, a gross temperature control range of ±1° F. around the set point has been found to be a good choice.

Once the room air temperature is within the gross temperature control range, the present process looks to see if the flow rate from the diffuser is in the wrong direction. If it is increasing when it should be decreasing or stable, the power range limits and power level of the heater are adjusted. These steps are shown by steps 107 in FIGS. 8A and 8B. If the flow rate is "stable" or in the proper direction to reach the target temperature control range, the process proceeds to power level adjustment steps.

The power level adjustment steps of FIGS. 9A and 9B, steps 108, look for flow rate stability. If the flow rate is stable, the flow rate is "kicked" to produce increasing or decreasing flow in a direction driving the room air temperature toward the target temperature control range. The power level is then recalculated in a direction which tends to drive the room air temperature toward the set point. The process then locks out further changes and looks for a "stable" air flow rate, at which point the room air temperature is again compared to the set point temperature to see if it is within the target temperature control range. If it is not, the flow rate is "kicked" again to produce movement, the power level is reset and the process waits until stable flow occurs again before making any further power level adjustments.

For the embodiment of FIG. 3, controlling around a target temperature control range of ±0.25° F. of the set point has been found to produce stable and reliable room air temperatures.

User Input

Initially, a user input step normally is made to controller circuit 77 to input one or more room air temperature set points for heating and for cooling, and possibly set points for night operation. Most typically, a default temperature set point, or points, will be input at the factory but they may be changed or customized in the field by user input device 101, which preferably is the building management system computer. Diffuser 71 also can have a plug-in terminal for input of set point temperatures by a laptop computer input device 101 at the diffuser. In fact, it also would be possible to provide manual input knobs or buttons on the diffuser housing or on a remote wall.

Mapping of Process Portions

Referring now to FIG. 4, an adaptive expert system embodiment of the overall control process is shown. After any desired user input to change the default set point temperatures, the present process senses the room air temperature, the supply air temperature and the supply air flow rate.

After the temperature and flow rate sensing steps 102 and 103, the present process most preferably calculates and uses a temperature difference between the corrected room air temperature and the set point temperature, as shown in step 104 in FIG. 4. The set point temperature is subtracted from the corrected room air temperature to produce a temperature difference which is used in the subsequent steps.

Next, the process looks at the power range limits in a power level register 112, and in step 105 any non-zero or non-maximum value for the power level is moved from a "current" power level register to an "old" power level register. If there is no stored upper limit (for example, which could be the case in a start-up situation), the next step, 101, is to reset the power range limits to zero and maximum, and set the "current" power level register to the halfway level between the range limits.

The first major control step, other than parameter sensing and power register settings, is provided by process portion 106 of FIG. 7. If the temperature differences is outside a gross control temperature range, for example, if the difference is greater than ±1° F., the room air temperature preferably is to be driven as fast as possible for the given diffuser toward the gross temperature control range by steps 106.

Process portion 106 is implemented by first determining whether or not the difference between the sensed and correct room air temperature and the set point temperature is outside the gross control temperature range. For example, if the diffuser is in a heating mode, and the difference between the sensed room air temperature and the set point temperature is +2° F., heater 74 on actuator 72 clearly should not be operating. The heater should be shut down and actuator 72 should close damper 80 so as to stop all further discharge of warm supply air into an already too warm room. If process portion 106, therefore, finds that the system is outside a gross or initial control range, it resets the heater power limits to maximize the range between the upper and lower limits, resets the current power level register to maximum or minimum power, and outputs the current power level to power module 79. Resetting the power range limits of the heater is shown in FIG. 4 by an arrow 110 to power level and power range registers 112. Outputting of maximum power is shown by an arrow 111 to power module 79.

In the preferred implementation, register 112 includes registers for storing the upper and lower limits of the range of power settings for heater 74. Registers 112 also include two power level setting registers namely, a current register and an old or preceding power level register. In the process of the present invention, the power level is often recalculated and stored without outputting the same to power module 79. In process step 106, however, an output to power module 79 is immediately made if the difference between the set point and the sensed room air is outside the gross control range, for example, ±1° F.

Process portion 106, therefore, drives the room air temperature into a gross temperature control range which is reasonably close to the set point, for example, ±1° F. from the set point, preferably as rapidly as possible by substantially fully opening or substantially fully closing damper assembly 80.

Once process steps 106 set the damper at fully open or fully closed, the process continues to process portion 107 of FIGS. 8A and 8B. Since, however, it will take some period of time for the room air temperature to be driven to the gross or initial temperature control range, none of the steps in process portion 107 will be implemented until the ±1° F. range is reached. The temperature difference will be outside the ±1.0° F. range and step 202 shows "no change." The process, therefore, will continue to process portion 108, shown in FIGS. 9A and 9B. Again, the difference between room air temperature and the set point temperature will still be out of range (above ±1.0° F.), step 251, so that none of the other process steps 108 will be given effect. Full or zero power will continue to be output at step 124, and the diffuser will be discharging zero volume or maximum volume to drive the temperature difference into ±1.0° F.

Once through steps 107 and 108, the overall process repeats or loops back to the start, as indicated by arrow 117. This looping continues until the difference between the sensed room air temperature and the set point falls within the gross control temperature range. It would be possible, of course, to loop back earlier but all the controls steps of process portions 107 and 108 can be sequentially performed in less than one second, and the sensed room air temperature changes will be much slower. In fact, it is believed to be desirable to include a slight delay (so that the loop time is not less than one second) at step 142 before repeating the process in order to insure accuracy of the calculations and stability of the adjustments.

Once room air temperature has been driven into the desired gross operating temperature range (±1° F.) by process steps 106, the next portion of the control process, process portion 107, will become effective and will adjust the heater range limits and calculate and store, but not output, a new or "current" heater power level setting if the flow rate from the diffuser is in the wrong direction.

Unless the temperature difference is very small (±0.1° F.) as indicated by step 202, and unless the flow rate is "stable" or in the correct direction, the outcome of process portion steps 107 is to move one of the heater range limits to its highest possible setting and to calculate a new current power level for the heater as a starting point for non-full-open or non-full-closed operation. The new range limit and power level setting are sent to register 112, as indicated by arrows 114 and 115, but they are not output to power module 79 until the final power level has been determined by process portion steps 108.

Process steps 108 either output the current power level established by steps 107 or, if possible, narrow the power range limits, recalculate the current power output level, and cause the heater to be driven at the recalculated current power level.

Using a new target temperature control range around the set point, for example, ±0.25° F., process steps 108 reset one of the range limits, "kick" the system with step of heater power to overcome hysteresis effects, look for a flow rate change, and thereafter, narrow the power limit range and recalculated and the current power level. If the temperature difference is already within ±0.25° F., further limit resetting and power level recalculation is omitted and the process proceeds to output step 124, which causes a signal 119 to be sent to register 112 to output the current power level in register 112 to power module 79. The process then returns to portion 102/103, as indicated by arrow 117.

Since the room will now be in the narrow target temperature control range (±0.25° F.), no changes will occur in process steps 106 since steps 106 adjust only when the temperature difference is greater than ±1° F. The range limits, however, may be reset in steps 107, and the power level recalculated unless the temperature is within ±0.1° F. if the flow rate is in the wrong direction. If the temperature differential is still between ±0.25° F., steps 108 will again output the current power level (which may or may not have been adjusted by steps 107).

As changes occur in the room, the sensed room air temperature will drift away from target temperature control range of ±0.25° F., and the adaptive process above described will again bring it back into the control band of ±0.25° F. The result of the present control process and apparatus is to enable control of VAV diffuser 71 so that the room air temperature is controlled so as to vary minimally relative to a ±0.25° F. range about the set point temperature for both heating and cooling modes. Room air is not held to within ±0.25° F. of the set point, but the adaptive process tends to reduce will temperature swings, overshoots, undershoots and the like, and when they dynamically occur within the room, the present process returns the room to a stable, controlled condition about the ±0.25° F. band more quickly than prior art systems.

Range and Algorithm Selections

In the preferred form of the method and apparatus of the present invention, the particular diffuser assembly configuration or physical geometry to be controlled by adaptive controller 77 is tested in a test facility so as to enable the selection of control ranges and algorithms which will produce the desired response in terms of the discharge of supply air. The hysteresis effects of FIG. 1 can essentially be compensated for by operating heating assembly 74 so as to more rapidly displace piston 73 over temperature changes. The legs 23 and 25 of curve 21 in FIG. 1, for example, can be made near vertical and separated by only a fraction of a degree, for example, 0.10° F. by applying heat to the thermally-powered actuator.

Such laboratory testing also is used to select the process ranges for control decisions which are placed in the control program at the factory. Thus, the gross temperature control range of ±1.0° F. for process steps 106 and the selection of the limit adjustment range ±0.1° F. for heater range limit adjustment steps 107 and the target temperature control range of ±0.25° F. for power level process portion 108, can all be selected and tested for a particular diffuser, namely, the square diffuser configuration of FIG. 3. For another diffuser, a gross temperature control range of about ±1.5° F. for steps 106 might be more desirable. Generally, the gross temperature control range is desirably a relatively narrow range, but the same FIG. 3 diffuser also could be controlled using a ±1.5° F. gross temperature control range using the present process. The only disadvantage of a larger range would be that the subsequent process steps 107 and 108 would require more time to bring the room to a relatively stable tracking around the target temperature control range of ±0.25° F.

Selection of the ±0.1° F. limit adjustment range and ±0.25° F. target temperature control range of process portions 107 and 108 also can be varied based upon the diffuser configuration and a judgment as to how closely one should attempt to control the room air temperature. Thus, the present process could also be implemented using a ±0.3° F. range for the limit adjustment range of process steps 107 and a ±0.5° F. range for power level adjustment process steps 108. Such greater ranges would reduce the number of adjustments made to the damper position, but room air temperature also would be less precisely controlled than would be possible using the narrower preferred ranges.

The primary reason for selecting different temperature control ranges for steps 107 and 108 is to facilitate data processing and only secondarily to effect performance. The limit adjustment range could be ±0.25° F., instead of ±0.1° F., but it is believed that a somewhat more stable system is produced if the ranges for steps 107 and 108 are different.

As will be seen below, the present process preferably only makes fine adjustments to the damper position after determining that a control parameter, such as the discharge flow rate of supply air or the rate of change of the room air temperature, has reached a "stable" condition. What constitutes a "stable" condition, however, also involves the selection of certain flow rate ranges or temperature rate of change ranges. What should constitute "stable" flow, for example, may vary from one diffuser embodiment to the next. The values for flow rates set forth in this specification are for the FIG. 3 diffuser, but a linear diffuser might well be found to be in a "stable" condition when the flow rate range is more narrow or more broad.

The selection of stability and other flow rate criteria for process portion steps 103 of FIG. 6, therefore, will also be determined through testing of a particular diffuser in a laboratory. Generally, these flow rate criteria will be established so as to reduce the tendency to control in response to what is only a transient sensed condition.

Selecting supply air flow rate criteria or ranges also will be influenced by the number of measurements which are averaged. As the number is reduced, there will be a greater influence of transient measurement on the decision process, which at some point could require a larger band or range to be used for "stable" flow.

The flow rate ranges, "X," "Y" and "Z" described below as the control parameters, therefore, are usually based upon laboratory testing for the particular diffuser and are placed in controller 77 at the factory.

An additional area of laboratory testing and factory input to the control program is in connection with the temperature correction process steps 102 of FIG. 5. The particular diffuser geometry and the placement of the room air temperature sensing transducer will have a significant effect on the room air temperatures which sensed. Moreover, the flow rates through the diffuse and method of inducing room air flow past the room air temperature sensor all will effect the temperature sensed. Finally, the mode of operation significantly influences the sensed room air temperature, as does room air stratification.

When a room air temperature sensor 83 is positioned in, or proximate, diffuser housing 86, the supply air passing through the diffuser will have an effect on the apparent temperature of the air sensed by sensor 83 by reason of heat transfer through the diffuser to sensor 83. Moreover, the room air itself typically will thermally stratify to some degree, with the warmest air being located near the ceiling, which is the location most commonly employed for mounting of diffuser assembly 71. Process portion 102 is used to track the apparent room air temperature sensed by sensor 83 and to provide a corrected output for the room air temperature, which corrected output greatly reduces the effect of supply air influence and room air stratification on the sensed apparent room air temperature.

While it would be possible to provide a room air temperature sensor 83 which is located at a position remote of diffuser assembly 71, for example, on a wall at about mid-height in a room, a disadvantage of that approach is that it requires special wiring and installation and may also benefit from some temperature correction. When room air temperature sensor 83 is mounted in diffuser 71, it is preferable to make a correction to the apparent or sensed temperature at the diffuser which takes into account possible stratification of the air in the room and the influence of the supply air passing through the diffuser.

A nominal test room can be employed to determine what an average room temperature will be when a sensor 83 mounted in or on diffuser assembly 71 is sensing an apparent room air temperature. Tests are run to correlate, during both the heating mode and the cooling mode and during various flow rates, the apparent room air temperatures sensed by sensor 83 to an average room air temperature at. This empirical correlation allows a correction to be made for both stratification effects and the heat transfer effects of the supply air on the sensed apparent room air temperature.

For a rectangular air diffuser assembly 71 constructed as schematically represented in FIG. 3, and shown in additional detail in U.S. Pat. No. 4,523,713, and for a test space or room which is 13 feet by 23 feet in area and has a ceiling height of 8 feet, and using averaging of the data from six sensor trees positioned around the room with temperature sensors at 4 inches, 32 inches and 67 inches from the floor, the "occupied zone" of the room, the heating mode algorithm was determined to be as follows:

$$T_C = T_A + \frac{T_A - T_S}{20} - \frac{Q}{480} + 1.90$$

The cooling mode algorithm for the same room and diffuser is as follows:

$$T_C = T_A - (10^{0.05826(T_S - T_A) - 0.45648}) - \frac{1.1Q}{480}$$

Where
 $T_C$=Corrected Room Air Temperature
 $T_A$=Apparent or Sensed Room Air Temperature—Last 10 averages
 $T_S$=Flow rate of Discharged Supply Air—Last 100 readings In general, the stratification effects have less significance when the system is in the cooling mode because the discharge of cool air at the ceiling produces better mixing in the room and less stratification.

Such algorithms can be empirically determined in a manner well known to those skilled in the art, and they will vary with variations in diffuser construction, the size of the test room and the data used to reach "average" room air temperature empirically determined to exist.

Room Air Temperature Sensing and Correction

Turning now to FIG. 5, the details of the temperature correction process steps 102 of the present adaptive control process and apparatus are schematically illustrated. This process portion is used to provide a corrected room air temperature which, in turn, may be used to calculate a temperature differential that is input to process portions 106, 107 and 108. The room air temperature sensing and correction process steps 102 also provide a supply air temperature input which is used in determining the mode of operation of the diffuser. The mode of operation also is used in various portions of process steps 106, 107 and 108.

The steps of sensing the supply air temperature, the apparent room air temperature and the supply air flow rate are indicated by steps or boxes 121, 122 and 123. Supply air flow rate is determined in a manner which will be described in more detail in connection with an air flow rate process steps 103 of FIG. 7.

A plurality of room air temperatures (for example, 10 measurements at one per second) are preferably sensed, stored and averaged, as indicated by step 125. Averaging reduces transient effects on the temperature sensed.

The next step will be to determine whether or not the system is in a heating mode or a cooling mode. This can be done, as indicated by decision diamond 128, by comparing the supply air temperature against the average apparent room air temperature. The comparison also could be made after temperature correction, but such accuracy is not normally required. If the supply air temperature is greater than the sensed average room air temperature, the system is considered to be in a heating mode, as indicated by box 129. Conversely, if the supply air temperature is less than the sensed average room air temperature, the system is considered to be in a cooling mode, as indicated by box 131.

The average supply air flow rate through the diffuser, and whether the diffuser is in heating mode or cooling mode, will both influence the amount of correction which must be made to the apparent room air temperature sensed by sensor 83. Thus, an empirically determined heating algorithm and an empirically determined cooling algorithm will be stored in a storage portion of the adaptive circuit chip 77. Heating correction step 132 will retrieve the heating algorithm if the system is in a heating mode, while the cooling correction algorithm will be retrieved at step 133 if the system is in a cooling mode.

The corrected room air temperature is now available for subtraction of the set point temperature for either heating or cooling, as indicated by box 104. Thus, if in the cooling mode, the process retrieves a cooling mode set point from a storage location in the chip, as indicated by step 138, and forwards the same to step 104 for subtraction from the corrected room air temperature. If in heating mode, a heating mode set point is retrieved from storage at step 139 and forwarded for use at step 104 in order to produce a temperature differential which is output to process portions 106, 107 and 108, as indicated by the output arrow from step 104.

The temperature difference can be positive or negative, but in the preferred logic used by the present process, the set point temperature is always subtracted from the corrected room air temperature to produce the difference to be output. The process could be run by always subtracting the corrected room air temperature from the set point but then the logic steps in portions 106, 107 and 108 would have to be adjusted to reflect such an order of subtraction.

The resultant output of the difference between the corrected room air temperature and the set point temperature from process steps 102 allows control of the variable air volume diffuser in a manner which is more accurate than simply using the apparent room air temperature at sensor 83. It will be appreciated, however, that the present adaptive control process and apparatus do not, in their broadest aspects, require that the apparent room air temperature sensed by sensor 83 be corrected before it is used in controlling the diffuser. Additionally, uncorrected control or control using a simplified constant temperature correction factor would be enhanced by the remainder of process steps and apparatus of the present invention.

Supply Air Flow Sensing

Referring now to FIG. 6, the preferred flow rate sensing steps 103 used in the adaptive control process of the present invention can be described in more detail.

A plurality of flow sensors or anemometers 88a, 88b, 88c and 88d are used to sense the diffuser supply air discharge flow rate. Applicant prefers to employ thermocouple probes, although thermistors, transistors and integrated circuit anemometers also may be employed. Such thermocouple-based anemometers are well known in the art, for example, the anemometer constructed as set forth in U.S. Pat. No. 4,848,147 Various thermistor and other air flow anemometer devices also are set forth in the prior art referred to in U.S. Pat. No. 4,848,147. Still other air flow rate sensors also may be suitable for use in the present invention.

It is preferred that a plurality of the sensors be spaced across diffuser neck 89 so as to reduce the effects from preferential flow patterns across the diffuser neck. The thermocouple probes 88a–88d are electrically pulsed to heat the same and then the cooling of the heated probe over time is measured to determined the fluid flow rate or velocity. Velocity measurements are then averaged at step 141, and a running average is stored and maintained at step 142. In the preferred embodiment, the running average which is maintained will include the most recent or latest 100 measurements, although another number of measurements could be employed. One hundred measurements can be taken at one per second by sensors 88a–88d. The purpose of creating a running average is to reduce the effects of transient flow rate changes.

The latest running average 142 is output one average at a time (arrow 145), for storing in a storage portion of the control chip in order to calculate a "previous running average," as shown by step 143. Thus, as a new average is input to step 142, as indicated by arrow 144, the oldest average stored for step 142, is moved, as indicated by arrow 145, to enable calculation of a previous running average at step 143. This requires that the oldest of the previous 100 average measurements be discarded, one at a time, as input is received at arrow 145.

In a start-up situation, that is, when there are less than 200 measurements (less than 200 seconds) the program can just assume that flow is "stable" when making other control decisions. Alternatively, the first average can be passed through to step 143 and subtracted from the second average at step 147. The third and fourth averages would be retained in step 142 while the first and second are passed to step 143 and subtracted at step 147 until two full sets of 100 averages are stored.

As indicated by arrow 146, step 142 also sends the latest running average on to the temperature correction process portion 102 as the supply air flow rate used for the heating and cooling algorithms.

Returning to FIG. 6, the previous running average 143 can then be subtracted from the latest running average 142 to produce a difference between the two running averages, as indicated by step 147. The difference between the running averages indicates whether or not the supply air flow rate is increasing or decreasing. A positive (+) number means the latest average is larger than the preceding average and thus that the flow rate is increasing. A negative (−) number indicates a flow rate which is decreasing.

As above noted, the range for air flow rate "stability" can vary from one diffuser configuration to another configuration. The number and placement of flow sensors 88a–88d, the number of measurements taken, and a judgment as to the confidence level needed are all involved in selection of a stability range.

In the present process it is preferred that three flow rate ranges be employed. A first range, herein referred to as the "X" range, is a flow rate range within which one can conclude the flow rate is "stable." Thus, if the output from step 147 is within the range of ±"X", the difference between the running averages indicates that the flow rate is within a range of flow rates which will be considered to be "stable."

In the present process, as is set forth below, once the flow rate is within the stable range, ±"X", power level adjustments are made. But, a first step of these adjustments is to "kick" the system in the direction of zero flow rate by a heater power step until the flow begins to increase or decrease. Once the flow rate can be sensed to move, increase or decrease from stability, the power level to the heater is adjusted and the flow rate is watched until the increasing or decreasing flow rate crosses a narrower range around zero, namely, until the flow rate returns to below +"Y" or above −"Y." Crossing the ±"Y" range is used to show that the increasing or decreasing flow rate is now "complete" and, since the ±"Y" range is less that the ±"X", that the supply air discharge flow rate has returned to a "stable" condition, in this case even closer to zero than ±"X."

Finally, a third range, the ±"Z" range, is employed to indicate when the diffuser flow rate is very far away from the "stable" range and in all probability operating to drive the system in the wrong direction. This ±"Z" range only is used to reset the power range limits in steps 107, not actually output a new power level to the heater.

The "X," "Y" and "Z" flow rate ranges can be input into the process program based upon empirical studies of the particular diffuser configuration being controlled. In most instances they do not need to be changed in the field, but it also would be possible to store these ranges in the circuit chip and change or replace them in the field using input device 101.

For the rectangular diffuser as shown schematically in FIG. 3, it has been found that a reasonable range for concluding that there is a "stable" flow rate will be when the difference between the two running averages is within ±8 cubic feet per minute. Thus, in decision step 153 in FIG. 6, the difference between running averages is compared against the factory input range ±"X," for example, 8 cubic feet per minute, as shown by step 154. If the difference is within ±8 cubic feet per minute, an output will occur, as indicated by step 156, indicating that the flow in the diffuser is "stable."

If the answer to step 153 is "no" then the flow rate is not stable and the next step 170 is to determine whether or not the flow rate is above or below the stable range by determining whether the flow rate difference is positive. If the answer is "yes," the flow rate is increasing (that is, above +"X") and if the answer is "no," the flow rate is decreasing (that is, below −"X"). Thus steps 175 and 180 output "flow rate increasing" and "flow rate decreasing" signals, respectively, which are used by the power level adjustment steps in a manner set forth below.

A "yes" answer at step 170 also is input to decision step 161, while a "no" answer at step 170 is input into step 164. As will be seen by arrows 166 and 167, the difference between the running averages is also communicated to decision steps 161 and 164. A lower factory input range, namely, range ±"Y," as indicated by step 155, also is stored in the processing chip. The difference between the running averages is therefore compared to the lower "Y" threshold, which for this diffuser is 1 cubic foot per minute. If the flow rate drops to below +1 cubic foot per minute, when the answer to step 170 is "yes," then the output from step 161 will be step 167, namely, "flow rate increasing complete." If the answer to step 170 is "no," then step 164 compares the difference between the running averages to a –"Y" threshold to determine when the difference rises above –"Y," namely, above –1 cubic foot per minute. When this occurs, the "yes" answer as step 164 produces a "flow rate decreasing complete" output, as shown by step 169.

The supply air flow rate outputs indicated by boxes 156, 167, 169, 175 and 180 are all communicated to the adaptive process steps 108 for use in adjusting the power level of the heater, as described below.

The present process also uses flow measurements to make power range limit adjustments in process steps 107. A larger range, ±"Z," is used for these adjustments. At decision steps 151 and 152, the ±"Z" range, here 30 cubic feet per minute, is compared against the difference between the two running averages. If the difference is less than –30 cubic feet per minute, an output indicating "flow rate decreasing" results, as indicated by box 159. If the flow rate is greater than +30 cubic feet per minute, an output of "flow rate increasing" will result, as indicated by step 163. The ±"Z" range is relatively large which signals the heater range limit adjustment steps 107 that very substantial flow rate increases or decreases are occurring, and as will be seen from step 107, the large flow rate is driving the system in the wrong direction.

Out-of-Range Adjustment

Adaptive process portion 106 of FIG. 7 determines whether or not the temperature difference, that is, the corrected room air temperature less the set point temperature, is outside a gross temperature control range for the diffuser. As above set forth, this gross temperature control range is set initially at the factory, and for the diffuser of FIG. 3 would be set at ±1° F. If the temperature difference is outside the gross temperature control range, the present process drives the room air temperature, and thus the difference, in a direction which will put the difference inside the gross range preferably as fast as possible. Thus, steps 106 substantially fully open or substantially fully close the damper assembly to produce a temperature difference within the gross temperature control range as rapidly as possible.

As shown in FIG. 7, the temperature differential and the heating mode and cooling mode determinations described in connection with FIG. 5 are used for steps 106. Thus, as indicated by decision step 173, when the system is in the heating mode, a comparison of the temperature differential of step 104 is made to the gross temperature control range limit of +1° F. If the answer is "yes," then the temperature differential is above the gross temperature control range, and step 174 causes a resetting of the power range limit register to minimum (zero) and maximum, and step 174a outputs zero power to module 79. Outputting zero power to heater 74 will cause the wax in the actuator to contract and piston 73 to retract. This, in turn, will close damper assembly 80 so that further hot air will not be discharged into the room, which is already more than 1.0° F. above the desired set point.

If circuit portion 106 finds, therefore, that the system is heating but the corrected room air temperature is above the set point by more than 1° F., it will open up the power range limit settings to their maximum limits and output minimum or zero power to the power module to substantially fully close the diffuser. As can be seen from arrow 176, after zero power is output, the process proceeds to step 181, namely, it continues on to the range limit adjustment steps of FIGS. 8A and 8B.

If, however, the temperature differential is not more than 1° F. above the set point, as indicated by a "no" answer at decision at step 173, a second decision must be made, as indicated by step 178. Thus, the temperature difference is compared to the lower limit of the gross temperature range, and the question is asked as to whether or not the temperature difference is less than –1° F. below the set point temperature. If the answer is "no," then steps 173 and 178 have determined together that the temperature differential is between ±1° F. of the set point temperature, and the process proceeds directly to range adjustment steps 107, without any changes to the power limits and without any power output to the heater. This is indicated by arrow 179 which goes to output step 181.

If the answer to the second decision step 178 is "yes," when the system is in a heating mode, the temperature differential is below –1° F. This means the room is too cool and the damper should be opened. Step 177 resets the power limits for the heater in the power limit register 112, and step 183 sends an output full power to the power level register, as indicated at 110, as well as causing the process to proceed to the range limit adjustment steps, as indicated by arrow 176a. When full power is applied to heater 74, the damper assembly 80 will open relatively quickly to a substantially fully open position and warm supply air will be discharged into the space so as to drive the room air temperature up to a level so that the temperature difference is above the lower limit, namely, above –1° F., of the gross temperature control range.

Since fully opening or fully closing the damper drives the room air temperature as fast as possible, the gross temperature control range preferably should be large enough so that the room air temperature will not be easily driven across the gross temperature control range by steps 106. It has been found that for the diffuser of FIG. 3 the gross temperature control range can be relatively narrow, namely, only 2° F., since the room air temperature will move relatively slowly in response to changes in supply air discharge rates. As will be understood, however, it also is within the scope of the present invention to bracket the set point temperature symmetrically or asymmetrically by gross temperature control ranges which vary from 1° F. For a particular system, for example, the gross temperature control range could be +1.5° F. and –2.5° F., or other values. The gross temperature control range should be broad enough to allow the room to be driven into the gross temperature control range relatively rapidly. This is most preferably done by driving the damper to a fully opened or fully closed position, but it is also broadly within the scope of the present invention to only partially open or close the damper so as to drive the room air temperature more slowly into the gross temperature control range. The gross temperature control range is also preferably relatively narrow so that the system can be driven, without endless hunting, to an even more narrow target temperature control range and held closely to the narrower target range by relatively minor adjustments of the power levels. As will be seen below, the present system is capable of causing the room air temperature to follow a ±0.25° F. target temperature control range under stable thermal mass and stable thermal loading conditions.

In the cooling mode, process steps 106 are substantially as described for the heating mode, only the thresholds are reversed, as indicated by steps 191 and 192. If the temperature difference is less than –1° F. below the set point temperature, the room air temperature is already too cool, and the power limits are reset in register 112 and zero power is output to power module 79, as indicated by steps 193, 194 and arrow 110. This will substantially fully close the damper 80. The process then proceeds to the range adjustment steps 107, as shown by arrow 195 and step 196.

If the temperature differential is not less than −1° F., then the second step 192 tests whether or not it is more than +1° F. If the answer is "no," then the process continues by going to the range adjustment steps 107, as indicated by step 196.

If the temperature differential is more than 1° F., then a "yes" output occurs at step 192 which results in resetting of the power limits in register 112 and a full power output to the power module, as indicated by steps 197, 198 and arrow 110. This occurs because the system is in cooling mode and the corrected room air temperature is more than +1° F. above the set point temperature. Full power output substantially fully opens damper 80 to let more cool air into the room, and resetting of the power limits gives a broader range for the heater operation until such time as the system is within ±1° F. of the set point. The process also proceeds as shown by arrow 199 to the range adjustment steps 107.

Power Range Limit Adjustments

Broadly, what is occurring in steps 107 of FIGS. 8A and 8B is to reset the power range limits and recalculate the power level if the room air is within the gross temperature range but the flow rate is substantial and in the wrong direction. If the flow rate is not extreme, that is within the ±"Z" range, or if the flow rate is in the correct direction, the process proceeds directly to power level adjustment steps 108 of FIGS. 9A and 9B.

Once the room air temperature is within the gross temperature control range of ±1° F. of the set point temperature, it is preferred that adaptive circuit 77 begin the less than fully open or less than fully closed damper adjustments by adjusting the power range limits so as to narrow the same for even more refined control of the volume of supply air discharged from diffuser assembly 71. The power range limit adjustment steps 107 are shown in FIGS. 8A and 8B.

When a signal is received from portion 106 of the process to go to range limit adjustment steps 107, for example, output steps 181 and 196, adaptive circuit 77 proceeds to set the upper and lower power range limits so that the power level established by subsequent power level adjustment steps 108 will be closer to that required to maintain diffuser air discharge volume at a rate which will produce control of the room air temperature about a narrower target temperature control range, in the preferred embodiment ±0.25° F. about the set point.

Step 201 in FIG. 8A compares the temperature difference from step 104 to a range of ±0.1° F. to ±1.0° F. If the answer at step 201 is "no," then the temperature difference must be inside ±0.1° F. of set point, or must be greater than ±1° F. In either case, the process proceeds to power level steps 108, as shown by step 202. If the difference is within ±0.1, the corrected room air temperature is very close to the set point and power range limit adjustments are not necessary. If the difference is more than ±1° F., process portion 106 is controlling the overall process, and range limit adjustments to maximum and minimum have already been made in process portion 106, as above-described.

When the answer to decision step 201 is "yes," processing will continue to step 203, which determines whether or not the corrected room air temperature is below the set point temperature or above it, that is, is the difference of step 104 between the two temperatures positive or negative. If the difference is below the set point, that is, negative, the steps in FIG. 8A proceed, and if the difference is above the set point, that is,, positive, the processing continues as shown in FIG. 8B. FIG. 8B and the rest of FIG. 8A after decision step 203 are analogous in their logic, but the results depend upon whether the system is being driven up to −0.1° F. or down to +0.1° F.

Continuing with FIG. 8A, a "no" answer at step 203 results in the process proceeding to two mode-determining steps 204 and 206. A "no" answer at either step 204 or 206 stops further processing at that branch of the diagram, but will also result in a "yes" answer at the other of steps 204 and 206. The process steps after the mode determination can be seen to be analogous, but the power range limits are adjusted in opposite directions in order to drive the room air temperature toward the target temperature control range of ±0.25° F.

If the system is in cooling, as indicated by mode input 131 (FIG. 5), step 204 will be answered "yes" and step 206 will be answered "no." At step 207, a flow rate determination is made using input from process portion 103 of FIG. 6. In this case, input 163 is made at step 207, and if the flow rate is found to be very far away from being stable on the positive side, that is, greater than +"Z" (e.g., greater than 30 cubic feet per minute), a "yes" answer results at step 207. This means that the temperature differential is below the target temperature control range, the system is in cooling, and the flow rate is rapidly increasing. Thus, the diffuser is driving the room air temperature in the wrong direction.

What needs to be done in such a situation is to change the power level range in a direction which will tend to correct the problem that the diffuser is open and cooling a too cool room. Thus, at step 208 the lower end of the power range is set to zero, since zero power to heater 74 on actuator 72 will result in closing damper assembly 80. Moreover, the upper range limit of the heater power is reset to the power level in the "old" power level register 112. Thus, the greatest amount of power which can be output to the heater is reduced to the old power level setting. These range limit resetting steps are input, as indicated by arrow 114, to the power range limit register 112.

At step 209, however, a new power level is also recalculated and sent to the "new" power level register, as indicated by arrow 115. This new power level is not output to power module 79 until process steps 108 are run.

In the preferred process, the new power level is recalculated to be 25% of the range from the new upper power range limit (namely, the old power level) toward zero. This recalculated power level, therefore, will result is less power to the heater, which will tend to close damper assembly 80. The lowering of the power level will not be as drastic as steps 106 because the system is not far out of the narrower target temperature control range.

It will be understood, however, that recalculation of the power level could be based upon another rule, for example, 10%, 33%, 50% or 60% of the range from the upper limit toward the lower limit. A recalculation of 25% has been found to be a good choice for the system of FIG. 3, but it also would be possible to change that value in the field by input device 101 if it takes too long to reach the target temperature control range of ±0.25 F, or if more damping of the system is required.

The next step is step 211 which triggers lockout step 212 preventing further range limit changes at step 208 if the recalculation step is not complete. Once the recalculation step 209 is complete, the process proceeds to release the lockout at step 213 and to the power level adjustment steps 108 of FIGS. 9A and 9B.

Returning to step 207, if the answer to decision step 207 is "no," the flow in the system is either broadly stable or decreasing. Broadly "stable" for power limit range adjustments is only a flow rate within ±"Z" (30 cfm), but once any previous power level recalculation has been completed, step 214 also releases the lockouts if the flow rate is within ±"X" or is a decreasing flow rate. The flow rate is considered to be sufficiently or broadly stable, or at least in the correct direction, and the process continues at step 216 to release any lockout and to proceed directly to steps 108 without a limit adjustment, as indicated by step 217.

A "yes" answer at step 206, indicating that the system is in a heating mode, produces a similar series of range limit adjustment steps, only now the diffuser will be driving the room air temperature the wrong way when the air flow is decreasing, that is below −"Z," as indicated by input 159 from FIG. 6. When the temperature difference is negative (a "no" answer at step 203), the system is in heating (a "yes" answer at step 206) and flow is rapidly decreasing or below −"Z" (a "yes" answer at step 221), the damper is relatively closed down when it should be opened to warm up the too cool room.

Step 222, therefore, resets the upper range limit to maximum and the lower range limit to the power level in the "old" register 112, while step 223 recalculates the power level at 25% of the range from the new lower range limit toward the maximum range limit. Again, the process locks out further range limit changes until the recalculation is complete and releases the same once it is complete.

As was the case for the cooling mode, if flow is broadly stable (above +"Z") or increasing, no range limit adjustments occur for the heating mode in steps 107, and the process proceeds directly to power level adjustment steps 108, as indicated by step 224.

FIG. 8B is analogous to FIG. 8A except that the temperature difference between corrected room air temperature and set point temperature is now positive, that is, it is between ±0.1° F. to ±1.0° F. Thus, if the system is in a cooling mode and flow is decreasing, the diffuser in driving the room air temperature in the wrong direction and range limit resetting step 226 takes place and power limit recalculation step 227 is implemented. If the system is in the heating mode and flow is increasing, the room air temperature again is being driven in the wrong direction and range limit setting step 228 and power level recalculation step 229 are implemented.

If the flow rate is broadly stable or in the correct direction, no range limit adjustments are made and the process proceeds to the power level adjustment steps 108, as indicated at boxes 231 and 232.

Power Level Adjustment and Output

One of the key aspects of the adaptive process and controller of the present invention is that, when making fine adjustments, it responds somewhat slowly and waits to see what is occurring, particularly in connection with flow rate sensing, before doing something else.

In FIGS. 9A and 9B, the first decision at step 251 is to determine whether the corrected room air temperature minus the set point temperature is between ±0.25° F. and ±1.0° F. If the answer to step 251 is "no," the temperature difference must be ±0.25° F. or greater than ±1.0° F. In either case, the process proceeds to step 252 and the power level in the current register is output to power module 79, as indicated by arrow 119. If the temperature difference is ±0.25° F., the room air is already within the target temperature control range, and the power level currently in register 112 will be likely to tend to maintain the temperature difference within the target temperature control range or at least not drive it rapidly in one direction or the other. If the temperature difference is more than the gross temperature control range of ±1.0° F., the system will be controlled by process steps 106 of FIG. 7. Full power output or zero power output, as established by steps 106, will be maintained. In either case, the process also will return to start over at the temperature and flow sensing steps 102 and 103, as indicated by step 253.

If the temperature difference is within the range of ±0.25° F. to ±1.0° F., process steps 108 proceed to recalculate and output a new power level in order to try to drive the room air temperature into the target temperature control range of ±0.25° F. The first step, step 254, determines whether the temperature difference is positive or negative. If the difference is negative, the steps in FIG. 9A proceed, while if the temperature difference is positive, the process proceeds as shown in FIG. 9B.

If the temperature difference is negative, that is between −0.25° F. and −1.0° F., the process moves forward to mode determination steps 256 and 257, in a manner analogous to that described for FIGS. 8A and 8B. One of these steps will produce a " yes" answer, while the other step will produce a "no," stopping further processing on the "no" branch.

Assuming the system is found to be in a cooling mode by reason of the presence of a signal at input 131, the next determination which is made is to look at the flow rate from the diffuser. Using the more narrow flow rate ranges relating to stability, namely, the "X" and "Y" ranges. Step 258 looks at the flow rate from the diffuser to see whether the flow rate is stable, that is, within the ±"X" range (in the preferred embodiment that would be ±8 cubic foot per minute). The larger ±"Z" range is used in the range limit adjustment process steps only.

If flow is found to be "stable" at step 258, the power level in register 112 is set lower to get ready to "kick" the system, as indicated by step 259 and arrow 113. If the flow rate is not "stable," the process does not proceed to step 259.

Since the temperature difference is negative and the system is in cooling mode, a stable flow rate indicates that the diffuser damper assembly is open too much and allowing too much cool air to enter the room. In the present process and apparatus, it is preferable to "kick" the system in order to overcome linkage and actuator hysteresis and produce a flow rate change in the proper direction. Thus, at step 259, the power level to heater 74 is stepped lower, possibly all the way to zero for a period of time long enough so that the flow rate sensors 88a–88d can sense that the flow rate is now decreasing. A low or zero power output to heater 74 will retract the piston in actuator assembly 72 and tend to close damper assembly 80. The flow rate from the diffuser will start decreasing, and when the flow rate drops below −"X" or below −8 cfm, a "flow rate decreasing" signal will be present at step 180.

Whether or not the power level is just lowered to produce the "kick" or dropped to zero, will depend on the actuator and heater being used. For actuators having relatively high temperature waxes and a relatively high powered heater, one need only lower the power level, not drop it to zero, to obtain significant damper movement and a relatively rapid flow rate change that can be "seen" by sensors 88a–88d. For lower temperature waxes and lower powered heaters, the power level can be set at zero to "kick" the system.

As will be seen in FIG. 9A, a "yes" answer at step 257 also causes the process to proceed to step 261. Step 261 is comprised of a determination as to whether the flow rate is decreasing, namely, whether input 180 from FIG. 6 is present. When the "kick" tending to close damper 80 at step 259 first occurs, the flow rate sensors will not "see" or sense any flow rate change. Thus, the answer at step 261 will initially be "no" and the process continues to step 263 via arrow 265. The lower (or zero) power level setting established by step 259 is therefore output to the heater (arrow 119), closing damper 80, and the process returns to the start (step 264).

Damper 80 will continue to be somewhat more closed than before for several loops through the process, during which the lower (or zero) power output is maintained, until the effect of closing the damper drives the flow rate negative below −"X" or below −8 cfm. When the flow rate falls below −"X," however, a signal is present at step 180, and the answer at step 261 changes from "no" to "yes."

Now that the flow rate has been "kicked" in the correct direction, the decreasing direction, the power level can be raised from the lowered (or zero) power "kick" to a new power level which will be above the lowered kick or step value but lower than the previous power level. The previous power level was causing the damper to be open too far (driving the room air temperature below the set point temperature in cooling).

The process proceeds from a "yes" answer at step 261 to step 266. At step 266, the upper range limit is reset (reduced) to the old or previous power level output, and a new power level is recalculated at 25% of the range from the upper power limit toward the lower power limit. Since the old power level was causing the room to be too cool in a cooling mode, moving the new power level somewhat lower will decrease the flow rate of cool air into the room, which is in correct direction to bring the temperature difference into the ±0.25° F. control target. The percentage of lowering the power level could be another value (e.g., 10%, 40%, 60%), but 25% has been found to be a good adjustment for the diffuser of FIG. 3.

The process then continues to step 267, which initially causes lockout step 268 to lockout any changes beyond those already being recalculated to occur to the range limits and the power level. When the new power level is recalculated, it is forwarded to register 112, as indicated by arrow 113, and step 267 yields a "yes" answer, which causes step 263 to output the new power level to heater module 79, as indicated by arrow 119. The process then returns to the start.

Lockout step 268 prevents further changes to the recalculated power level at step 266 until the lockout is released, which only occurs when the "decreasing flow rate complete" signal is received from step 169 to step 262.

It will be recalled that it was the lower (or zero) power level "kick" or step used to overcome hysteresis that resulted in the sensing of a flow rate decrease. When step 266 occurs, it reduces the power level from the old power level setting but the new power level will still be above the step level. The damper assembly will, therefore, open back up from its more closed position to a new open position slightly less than the old open position which was cooling the room too much. Once this new power level setting is output, the flow rate will start increasing from the closed damper flow rate, driving the flow rate from below −"X" (−8 cfm) upwardly until it is above −"Y" (−1 cfm). At this point, a "flow rate decreasing complete" signal ill be present at 169 and the flow rate will be well inside the ±"X" stable range (±8 cfm).

As can be seen in FIG. 9, a "yes" answer to step 261 latches, at step 271, step 262 "on" to look for a "flow rate decreasing complete" signal from step 169. Step 262, therefore, will not be actuated until and unless a "flow rate decreasing" signal has been found present at step 180.

The sequence, therefore, is that after the power step or "kick," which tends to move the damper in a direction reducing supply air discharge, the flow rate begins decreasing until it drops below −"X." This causes a "yes" answer at step 261 which latches "on" at step 262. As the flow rate begins to rise from below −"X," the "yes" answer turns to "no" at step 261, but the "no" answer is simply passed through step 262 to output the same power level as was established at step 266. Finally, when the flow rate rises back up above −"Y," a "yes" answer at step 262 occurs, which causes releases 272 and 273 to release lockouts 268, 269 and latch 271. The flow rate will be very close to zero, namely, just above −"Y" (−1 cfm), and the process will return to start, as indicated by arrow 274 and step 264.

The room air temperature also should now be closer to the target temperature control range of ±0.25° F., but if it is not within that band, step 266 is released for a power level recalculation and the air flow rate is highly likely to be within ±"X" (±8 cfm) and therefore stable for another "kick" and power level resetting sequence.

As will be seen, therefore, process steps 108 tend to look for initial stability in a ±"X" air flow rate range. They then "kick" the system to remove hysteresis and drive the flow rate in the correct direction. The power level is adjusted in the correct direction and further adjustments locked out until the flow rate has returned to a relatively small band ±"Y," at which point comparison of the corrected room air temperature to the set point is made again to see if the difference is now within the target temperature control range of ±0.25° F.

As will be appreciated, this process also occurs for the heating mode when the temperature difference is negative, as initiated by a "yes" answer at step 256. In the heating mode, the "kick" at step 281 is to increase or step the power level up from its current level (up to maximum, if necessary). This temporarily causes opening of the damper assembly until a "flow rate increasing" signal is received at step 175. Step 282 sets the lower limit of the power range at the old power level setting in register 112 and recalculates a new power level at 25% up from the new lower limit toward the upper limit. This will open the damper assembly slightly from the setting that was producing a room air temperature below the targeted temperature control range of ±0.25° F. This new power level will be locked in place until a "flow rate increasing complete" signal is received from step 167, at which point the flow rate will have dropped below +Y (+1 cfm) and the lockouts will be released for further power level adjustments, if required.

Similarly, in FIG. 9B, the process takes the same approach but now the temperature difference is positive, above the set point temperature in the +0.25° F. to +1.0° F. range. Now, the cooling mode steps are the same as the heating mode steps were for temperatures below the set point, and the heat mode steps are the same as the cooling mode steps when below the set point. The process "kicks" the flow rate, makes a small adjustment in the heater power level, looks for stable flow again and then decides whether a further adjustment needs to be made.

If dynamic thermal load changes, or other effects, combine with the power level adjustments, or on their own, drive the room air temperature outside the ±1.0° F. gross temperature control range, process steps 106 bring the room air temperature back to within a range which allows control by range adjustments (steps 107) and power level adjustments (steps 108).

Overshoots and offsets are reduced and eliminated by making changes and waiting for relatively stable air flow rates to result before making other changes. The adaptive powering of actuator 72 by resistance heater 74 minimizes the hysteresis effects of the actuator and linkage on the control process.

The adaptive circuit and process of the present invention have been described in detail using an expert system circuit as the preferred embodiment. As above-noted, other adaptive circuits and processes can be employed. For example, the above-described process can be implemented using a neural network, such as the commercially available neural network sold under the trademark BRAIN MAKER by California Scientific Software, Inc. of Nevada City, Calif.

Disadvantages of a neural network approach are that more memory is required, and the process moves more slowly toward the target control temperature range. As the neural network is made more strongly adaptive, aberrations in thermal loading or mass can cause the network to learn the wrong performance or take longer to straighten out after an aberrational load.

Finally, while the present apparatus and method most preferably employ supply air discharge flow rates as part of the sensed parameters used to control the adaptive process, it will be recognized that a purely temperature-based control process could be employed. Thus, the sensed room air temperature could be stored and room air temperature rates of change used for adaptive controlling. By employing a rate of change criteria for the room air temperature, "stable" temperature conditions could be sensed before making further damper (heater) adjustments.

In a manner analogous to the process FIGS. 7, 8A, 8B, and 9B, the room air temperature could be driven initially relatively rapidly toward a gross temperature control range by a substantially fully opened or fully closed damper. The system could then wait for stability, a temperature rate of change that was relatively low, and then begin fine temperature adjustments toward a narrower target temperature control range. A step or kick could be used to produce a temperature increase or decrease rate above or below a threshold for hysteresis minimization, the heater power reset, and temperature sensing continued in order to look for stability, namely, a relatively low rate of change of the room air temperature. The process would be repeated to track the narrower target temperature control range, and full open or full closed damper positions used if the room air temperature drifted out of the gross temperature control range.

What is claimed is:

1. A control assembly for control of the operation of an actuator for a movable damper assembly in a variable-air-volume diffuser comprising:
   at least one of a room air temperature sensor and a supply air discharge flow rate sensor; and
   a control circuit coupled to receive input signals from each of the sensors, said control circuit being formed for coupling to said actuator and responsive to the receipt of said input signals from the sensors to control movement of said actuator to thereby position said the damper assembly so as to control the volume of supply air discharged from said diffuser; and
   said control circuit further being responsive to input signals from the sensors to drive said room air temperature toward a target temperature by repetitively sensing a parameter with a sensor, waiting to sense a stable condition of said parameter, when said stable condition is sensed, adjusting the position of the damper assembly in a manner tending driving room air temperature toward the target temperature, and maintaining said damper in the adjusted position until a stable condition is again sensed by a sensor before again adjusting the position of said damper assembly.

2. The control assembly as defined in claim 1 wherein, said control assembly includes a room air temperature sensor, and
   said parameter sensed for a stable condition is the rate of change of room air temperature.

3. The control assembly as defined in claim 1 wherein, said control assembly includes a room air temperature sensor and a supply air discharge flow rate sensor, and
   said parameter sensed for a stable condition is the flow rate of supply air discharged from said diffuser.

4. The control assembly as defined in claim 3 wherein, said control assembly further includes a supply air temperature sensor,
   said control circuit is coupled to control operation of a heater assembly thermally coupled to a thermally-powered actuator, and
   said target temperature is a target temperature control range.

5. The control assembly as defined in claim 4 wherein, said control circuit is further responsive to input signals from said room air temperature sensor and said supply air temperature sensor to drive said actuator to cause said damper assembly to be positioned in one of a substantially fully opened and a substantially fully closed position until an input signal is received by said control circuit from said room air temperature sensor indicating that said room air temperature is within a gross temperature control range about a set point temperature larger than said target temperature control range.

6. The control assembly as defined in claim 4 wherein, said control circuit is responsive to input signals from said sensors to temporarily move the position of said damper assembly by an amount sufficient to produce a greater than needed change in the discharge flow rate in a direction driving said room air temperature toward said target temperature control range to overcome hysteresis effects,
   said control circuit is further responsive to input signals from said sensors after temporarily moving the damper assembly to adjust the position of said damper assembly to a new position approximating a needed change in the discharge flow rate from said diffuser, and
   said control circuit maintains said damper assembly in said new position until receipt of a flow rate input signal indicating that the discharge flow rate has reached a stable condition.

7. The control assembly as defined in claim 4 wherein, said control assembly includes a power module having a plurality of possible power level outputs forming a range of power level outputs, said range of power level outputs having limits which are variable; and
   said control circuit controls operation of said heater assembly by controlling the limits of said range of power level outputs and by controlling the selection of a power level within the limits of said range of power level outputs.

8. The control assembly as defined in claim 4 wherein, said control circuit includes a storage device and an input terminal coupled thereto for input of control parameters to said storage device of said control circuit, including at least one of:
   a. a room air temperature set point;
   b. stability condition criteria;
   c. a room air temperature correction algorithm;
   d. target temperature control range.

9. The control assembly as defined in claim 1 wherein, said control circuit is provided by an electrical expert system control circuit.

10. A method of controlling the operation of a variable-air-volume diffuser comprising the steps of:

adjusting the position of a damper assembly in said diffuser in a direction driving the room air temperature toward a target temperature upon sensing a stable condition of a control parameter, maintaining the adjusted position of said damper assembly until the control parameter becomes stable again, and once a stable condition is sensed, adjusting the position of said damper assembly again in a direction driving the room air temperature toward said target temperature.

11. The method as defined in claim 10 wherein,
said control parameter is supply air discharge flow rate.

12. The method as defined in claim 10 wherein,
said control parameter is the rate of change of room air temperature.

13. The method as defined in claim 10 and the step of:
when the room air temperature is outside a gross temperature control range about the target temperature, moving said damper assembly to one of a substantially fully closed and a substantially fully opened position to drive the room air temperature toward the gross temperature control range.

14. The method as defined in claim 13 wherein,
said moving step is accomplished by sensing both a room air temperature and a supply air temperature, determining whether said diffuser is in a heating mode or a cooling mode, and said moving step is accomplished by moving the damper assembly to a position determined by the mode of operation of the diffuser in order to drive the room air temperature toward the gross temperature control range.

15. The method as defined in claim 14 wherein,
said moving step is repeated in the event that said adjusting step should cause the room air temperature to move outside said gross temperature control range.

16. The method as defined in claim 10 wherein,
said adjusting step is accomplished by temporarily kicking the flow rate from the diffuser in a direction tending to drive the room air temperature toward the target temperature to reduce hysteresis effects, and then readjusting the position of said damper assembly at a position more likely to produce a room air temperature close to the target temperature under stable flow conditions, and while said damper assembly is in the readjusted position, waiting until a stable condition of the sensed parameter is sensed before making a further adjusting step.

17. The method as defined in claim 13 wherein,
said moving and adjusting steps are accomplished by controlling the operation of a heater assembly thermally coupled to a thermally-powered actuator operatively associated to move said damper assembly.

18. The method as defined in claim 17 wherein,
said step of controlling the operation of a heater assembly is accomplished using a room air temperature sensor, a supply air temperature sensor, and at least one supply air flow rate sensor, all electrically connected to an electrical control circuit assembly formed to be responsive thereto and coupled to control operation of said heater assembly.

19. The method as defined in claim 18 wherein,
step of controlling the operation of said heater assembly is accomplished using an expert system control circuit.

20. A variable-air-volume diffuser assembly comprising:
a diffuser housing formed for coupling to a supply air duct and having a discharge opening and a movable damper positioned for modulation of the volume of supply air discharged from said discharge opening;

an actuator assembly mounted to said housing and having a movable element positioned to effect displacement of said damper;

a control assembly coupled to said housing and connected to control operation of said actuator assembly;

at least one sensor assembly connected to said control assembly and formed to sense room air temperature in a room receiving supply air discharged from said diffuser assembly; and said control assembly including an electrical control circuit configured to provide a control function for operation of said actuator assembly and movement of said damper to thereby produce a desired response in movement of room air temperature toward a set point temperature, said control circuit further changing said control function in response to sensor input signals as to room air temperature when the sensed room air temperature indicates that the actual response of room air temperature varies from the desired response.

21. The variable-air-volume diffuser assembly of claim 20 wherein,
said control circuit further is provided by a control circuit in which said control function is change in response to said input signals by one of:
an expert system deductive control circuit;
a neural network inductive control circuit;
at least one control function look-up table; and
an algorithm circuit with changeable constants.

22. The variable-air-volume assembly of claim 21 wherein,
said sensor assembly further includes a supply air flow sensor mounted in a supply air flow path; and
said control circuit is further responsive to supply air flow rate signals to change said control function controlling movement of said damper.

23. The variable-air-volume diffuser of claim 22 wherein,
said control circuit responds to said sensor input signals in order to compensate for at least one of:
(1) hysteresis in said actuator assembly;
(2) the speed of response of said actuator assembly;
(3) hysteresis in a linkage between said actuator assembly and said damper;
(4) supply air influence on said sensor resulting from the location of said sensor in said housing;
(5) the presence of a dead-band in a thermostat and a control circuit for the thermostat coupled to said diffuser assembly;
(6) variations in thermal loading of the space into which said supply air is discharged;
(7) variations in thermal mass of the space into which said supply air is discharged; and
(8) ambient influences on said actuator.

24. The variable-air-volume diffuser of claim 22 wherein,
said control circuit is configured to cause said damper to move in a manner substantially eliminating the effect of pressure changes in said supply air on the volume of supply air discharged from said diffuser assembly.

25. The variable-air-volume diffuser of claim 22 wherein,
said actuator assembly is provided by a thermally powered actuator;
said control circuit is an electrical control circuit and includes a heating assembly having a heating element coupled to said thermally powered actuator, said electrical control circuit being electrically connected to said heating assembly and to said sensors; and said sensor assembly is provided by an electrical supply air temperature sensor, an electrical room air temperature sensor, and an electrical supply air flow rate sensor assembly, all electrically coupled to provide input signals to said adaptive electrical control circuit.

26. The variable-air-volume diffuser of claim 25 wherein, the temperature sensors and supply air flow rate sensor are mounted to said diffuser housing.

27. The variable-air-volume diffuser of claim 22 wherein, said actuator assembly is provided by an electric motor, a switch assembly connected between said motor and said control circuit, and a mechanical coupling between said motor and said damper.

28. The variable-air-volume diffuser of claim 27 wherein, said motor is a reversible motor, and said switch assembly is a three position switch having switch positions for clockwise and counterclockwise rotation of said motor and for a stationary condition of said motor.

29. The variable-air-volume diffuser of claim 27 wherein, said actuator is thermally powered;

said sensor is a thermostat assembly positioned remote of said diffuser and electrically connected to said adaptive control circuit; and said adaptive control circuit is configured to compensate for a dead band in said thermostat assembly.

30. A variable-air-volume diffuser comprising:

a variable-air-volume diffuser having an actuator formed to vary the volume of supply air discharged from said diffuser;

an control assembly coupled to control operation of said actuator and including at least one sensor formed to sense a parameter affected by operation of said diffuser, said adaptive control assembly including one of:

an expert system circuit;

a neural network circuit;

a fuzzy system circuit;

a planning system circuit;

a genetic algorithm circuit; and said control circuit periodically polling said sensor and modifying a control function of said control circuit to control operation of said diffuser based upon the periodically sensed parameter in the event that said sensed parameter indicates that actual response of the sensed parameter varies from a desired response of the parameter to the discharge of supply air from the diffuser.

31. A method of controlling the operation of a variable-air-volume diffuser comprising the steps of:

controlling the movement of a movable flow-modulating damper in said diffuser using a movable actuator assembly;

controlling the movement of said actuator assembly by an control assembly coupled to said actuator assembly;

periodically sensing a parameter of a space into which said diffuser is discharging supply air with a sensor coupled to said control assembly; and modifying a control function of said control assembly to control operation of said actuator assembly with said control assembly in response to periodic sensing of said parameter and one of inductive and deductive adaptations of the control function of said adaptive control assembly when the sensed parameter responds in a manner different from an optimal response.

32. The method of claim 31, and the step of:

prior to said step of controlling movement of said actuator assembly, configuring said control assembly to produce an optimal response of said actuator assembly movement for a test space.

33. The method of claim 31 wherein, said step of controlling movement said damper is accomplished using a movable thermal actuator assembly; and said step of controlling movement of said actuator assembly is accomplished by controlling operation of a heating assembly mounted to apply heat to said thermal actuator assembly 34. The method of claim 31 wherein, said step of controlling movement of said damper is accomplished using an electric motor as said actuator assembly; and said step of controlling movement of said actuator assembly is accomplished by controlling electrical power communicated to said electric motor.

35. The method of claim 31 wherein, said sensing step is accomplished by sensing a plurality of different parameters; and said modifying step is accomplished based upon a combination of sensed different parameters.

36. A variable-air-volume diffuser assembly comprising:

a diffuser housing formed for coupling to a supply air duct and having a discharge opening and a movable damper positioned for modulation of the volume of supply air discharge from said discharge opening;

an actuator assembly mounted to said housing and having a movable element positioned to effect displacement of said damper;

a control assembly coupled to said housing and connected to control operation of said actuator assembly;

a sensor assembly connected to said control assembly and including:

a room temperature sensor formed to sense room air temperature in a room receiving supply air discharged from said diffuser assembly, a supply air flow sensor mounted in a supply air flow path, and a supply air temperature sensor electrically connected to said control circuit; and said control assembly including an electrical control circuit configured to provide a control function for operation of said actuator assembly and movement of said damper in response to sensor input signals, said control circuit being further configured to substantially eliminate the influence of supply air temperature on sensed room air temperature in controlling the volume of supply air discharged from the diffuser assembly.

* * * * *

UNITED STATES PATENT AND TRADEMARK OFFICE
CERTIFICATE OF CORRECTION

PATENT NO. : 6,250,560 B1
DATED : June 26, 2001
INVENTOR(S) : Kline et al.

It is certified that error appears in the above-identified patent and that said Letters Patent is hereby corrected as shown below:

Title page,
Item [54], Title, insert a -- , -- after "DIFFUSER"

Item [56], References Cited, add -- 2,876,629  3/1959 Dube et al. --

Column 1,
Title, insert a -- , -- after "DIFFUSER".

Column 8,
Lines 38-40, under BRIEF DESCRIPTION OF THE DRAWING, delete FIG. 6, and substitute therefor:

-- FIG. 6, diagrammatically illustrates the relationship between FIGS. 6A and 6B.

FIG. 6A is a portion of the overall process flow diagram mapped in FIG. 4 showing the initial portion of the supply air flow rate steps.

FIG. 6B illustrates a remainder of the supply air flow rate steps. --

Lines 44-55, under BRIEF DESCRIPTION OF THE DRAWING, delete FIGS. 8A-9B, and substitute therefor:

-- FIG. 8A diagrammatically illustrates the relationship between FIGS. 8A-1 and 8A-2.

FIG. 8A-1 is a portion of the overall process flow diagram mapped in FIG. 4 showing a portion of the heater range limit adjustment steps for the heating mode.

FIG. 8A-2 illustrates a remainder of the heater range limit adjustment steps for the heating mode.

FIG. 8B diagrammatically illustrates the relationship between FIGS. 8B-1 and 8B-2.

FIG. 8B-1 corresponds to FIG. 8A-1 and shows a portion of the heater range limit adjustment step for the cooling mode.

UNITED STATES PATENT AND TRADEMARK OFFICE
CERTIFICATE OF CORRECTION

PATENT NO. : 6,250,560 B1
DATED : June 26, 2001
INVENTOR(S) : Kline et al.

It is certified that error appears in the above-identified patent and that said Letters Patent is hereby corrected as shown below:

FIG. 8B-2 corresponds to FIG. 8A-2 and shows a remainder of the heater range limit step for the cooling mode.

FIG. 9A diagrammatically illustrates the relationship between FIGS. 9A-1 and 9A-2.

FIG. 9A-1 is a portion of the overall process flow diagram mapped in FIG. 4 showing a portion of the power level adjustment steps for temperatures above the set point temperature.

FIG. 9A-2 illustrates a remainder of the power level adjustment steps for temperatures above the set point temperature.

FIG. 9B diagrammatically illustrates the relationship between FIGS. 9B-1 and 9B-2.

FIG. 9B-1 corresponds to FIG. 9A-1 and show a portion of the power level adjustment steps for temperatures below the set point temperature.

FIG. 9B-2 corresponds to FIG. 9A-2 and shows a remainder of the power level adjustment steps for temperatures below the set point temperature. --

Column 10,
Line 32, change "58" to -- 59 --.

Column 27,
Line 57, change "ill" to -- will --.

Signed and Sealed this

Fifteenth Day of January, 2002

*Attest:*

*Attesting Officer*

JAMES E. ROGAN
*Director of the United States Patent and Trademark Office*